(12) United States Patent
Hoshino et al.

(10) Patent No.: US 12,106,460 B2
(45) Date of Patent: Oct. 1, 2024

(54) INFORMATION PROCESSING APPARATUS, INFORMATION PROCESSING METHOD, AND NON- TRANSITORY COMPUTER-READABLE STORAGE MEDIUM

(71) Applicant: CANON KABUSHIKI KAISHA, Tokyo (JP)

(72) Inventors: Shoichi Hoshino, Tokyo (JP); Atsushi Nogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 17/575,672

(22) Filed: Jan. 14, 2022

(65) Prior Publication Data

US 2022/0136979 A1   May 5, 2022

Related U.S. Application Data

(63) Continuation of application No. PCT/JP2020/022820, filed on Jun. 10, 2020.

(30) Foreign Application Priority Data

Jul. 22, 2019 (JP) ................. 2019-134801

(51) Int. Cl.
G06T 7/00       (2017.01)
G06T 3/4038     (2024.01)

(52) U.S. Cl.
CPC .......... G06T 7/0002 (2013.01); G06T 3/4038 (2013.01)

(58) Field of Classification Search
CPC ................. G06T 7/0002; G06T 3/4038; G06T 2207/20021; G06T 2207/20084;
(Continued)

(56) References Cited

U.S. PATENT DOCUMENTS

| 10,776,910 B2 | 9/2020 | Karube |
| 2011/0091069 A1 | 4/2011 | Anabuki et al. |

(Continued)

FOREIGN PATENT DOCUMENTS

| JP | S63-228269 A | 9/1988 |
| JP | 2005-310044 A | 11/2005 |

(Continued)

OTHER PUBLICATIONS

U.S. Appl. No. 17/667,567, filed Feb. 9, 2022 (First Named Inventor: Atsushi Nogami).

(Continued)

*Primary Examiner* — Samir A Ahmed
(74) *Attorney, Agent, or Firm* — Venable LLP

(57) ABSTRACT

This invention provides an information processing apparatus comprising an image creating unit which creates, from a first image associated with global coordinates, a partial image that is a portion of the first image, as a second image, a recognition processing unit which executes, on the second image, recognition processing of a preset characteristic, and creates a recognition result associated with local coordinates of the second image, and a coordinate converting unit which converts the coordinates of the recognition result from the local coordinates into the global coordinates.

8 Claims, 20 Drawing Sheets

(58) Field of Classification Search
CPC . G06T 2207/20104; G06T 2207/30132; G06T 7/0004; G06T 3/00; G01B 11/30
See application file for complete search history.

(56) References Cited

U.S. PATENT DOCUMENTS

2018/0300874 A1  10/2018  Karube
2020/0118263 A1   4/2020  Nogami et al.

FOREIGN PATENT DOCUMENTS

| | | |
|---|---|---|
| JP | 2014-228357 A | 12/2014 |
| JP | 6099479 B2 | 3/2017 |
| JP | 2017-227595 A | 12/2017 |
| JP | 2018-156317 A | 10/2018 |
| JP | 2018-195001 A | 12/2018 |
| JP | 2019-087050 A | 6/2019 |
| WO | 2017/126367 A1 | 7/2017 |
| WO | WO 2017119202 A1 * | 7/2017 |
| WO | 2018/037689 A1 | 3/2018 |

OTHER PUBLICATIONS

Sep. 24, 2020 International Search Report in International Patent Appln. No. PCT/JP2020/022820.

\* cited by examiner

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2020/022820, filed Jun. 10, 2020, which claims the benefit of Japanese Patent Application No. 2019-134801, filed Jul. 22, 2019, both of which are hereby incorporated by reference herein in their entirety.

BACKGROUND OF THE INVENTION

Field of the Invention

The present invention relates to an information processing apparatus, an information processing method, and a non-transitory computer-readable storage medium.

Background Art

In inspection of wall surfaces of constructions such as bridges, appearance examination of components and product exteriors, and the like, image inspection is performed in which a captured image of an examination target is used. In image inspection, a research technical person inputs the position, the shape, and the like of a deformation such as a crack or a defect based on an image, and records the image and the deformation information in association. Patent Document 1 suggests a system for displaying an image and drawing data of a wall surface of a construction in association, and receiving input of a deformation. It becomes easy to manage and view inspection results by associating a drawing, an image of a wall surface, and deformation information of the wall surface with each other as in PTL 1.

In order to check for a minute deformation such as a crack in an image, an image captured with a sufficiently high resolution needs to be used. As a result, the data amount of an image of a whole construction is very large, and thus the cost of a deformation input operation is high. In recent years, in order to increase the efficiency of the operation, techniques for recognizing a deformation in an image of a wall surface have been suggested.

However, there is an upper limit to an image size that enables recognition processing to be executed, due to the restraints of the memory of an information processing apparatus or the like. Therefore, it is difficult to execute processing for recognizing deformations in a large image of an entire construction at a time.

CITATION LIST

Patent Literature

PTL 1: Japanese Patent Laid-Open No. 2005-310044
PTL 2: Japanese Patent No. 6099479
PTL 3: Japanese Patent Laid-Open No. 2017-227595

SUMMARY OF THE INVENTION

The present invention has been made in view of the aforementioned problem, and aims to provide a technique for performing recognition in partial images and managing recognition results of the partial images in association with an entire image.

According to an aspect of the invention, there is provided an information processing apparatus comprising: an image creating unit which creates, from a first image associated with global coordinates, a partial image that is a portion of the first image, as a second image; a recognition processing unit which executes, on the second image, recognition processing of a preset characteristic, and creates a recognition result associated with local coordinates of the second image; and a coordinate converting unit which converts the coordinates of the recognition result from the local coordinates into the global coordinates.

Further features of the present invention will become apparent from the following description of exemplary embodiments with reference to the attached drawings.

DESCRIPTION OF THE EMBODIMENTS

Figure 1A:
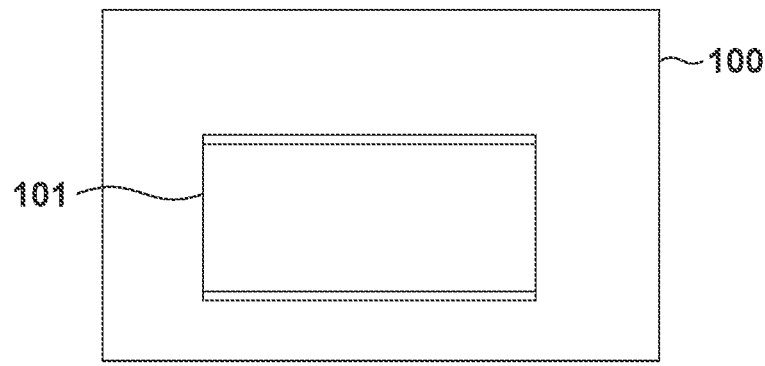
FIG. 1A is a diagram for schematically describing an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of processing for performing recognition in an entire image of an examination target, and managing recognition results in association with a drawing will be described as a first embodiment. In particular, in the present embodiment, a description will be given by way of example of an information processing system for performing what is known as infrastructure inspection in which age-based deterioration of a construction such as a bridge is inspected.

Terms used for describing the present embodiment are defined as follows. "Examination target" refers to a concrete construction or the like when an information processing system for performing infrastructure inspection is described. The user of the information processing system to be described in the present embodiment intends to examine, based on a captured image of an examination target, whether or not a deformation such as a crack is present on the surface of the examination target. Examples of the "deformation" include cracks, floating, and peeling of concrete, in a case of a concrete construction. Additionally, efflorescence, exposure of a reinforcing steel bar, rust, water leakage, water dropping, rust, damage (part missing), cold joint, precipitates, honeycomb, and the like are also included.

"Global coordinates" refer to Cartesian coordinates in a plane that indicate drawing coordinates of an entire construction, in the present embodiment.

"First image" refers to an entire image of a construction associated with drawing coordinates. In the present embodiment, it refers to a captured image of a wall surface of a concrete construction.

"Second image" refers to a partial image of a construction associated with drawing coordinates. In the present embodiment, a second image is created based on a first image.

"Local coordinates" refer to image coordinates associated with a first image.

In inspection of a wall surface of an infrastructure construction, the inspector records a deformation such as a crack in the concrete wall surface. In inspection that uses an image, the inspector captures an image of the wall surface of the construction, and creates an inspection result by recording the position and the range of a deformation from the captured image. The created inspection result is managed along with the image in association with a drawings of the construction. At this time, an operation of finding and recording all of the deformations from the image is a laborious operation. Therefore, it is preferable that deformations are automatically identified from the image through recognition processing that is performed by a machine.

A construction image is captured with a high resolution, and thus the size of the image is very large. On the other hand, due to the restraints of the memory of the information processing apparatus and the like, there is an upper limit to an image size that enables recognition processing to be executed. Therefore, it is difficult to execute recognition processing on a large-size image at a time. In view of this, in the present embodiment, recognition processing is executed for each partial image suitable for recognition processing from a construction image, and recognition results are acquired. The acquired recognition results are mapped onto the original drawing. Accordingly, it is possible to acquire recognition results associated with the construction drawing, and manage them on the drawing. FIG. 1 shows a flow of main processing in the present embodiment.

Figure 1B:
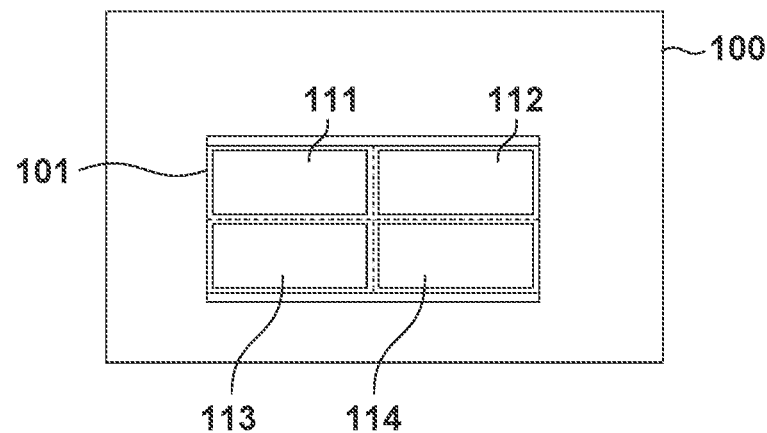
FIG. 1B is a diagram for schematically describing an embodiment of the present invention.
Figure 1C:
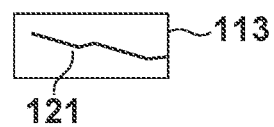
FIG. 1C is a diagram for schematically describing an embodiment of the present invention.
Figure 1D:
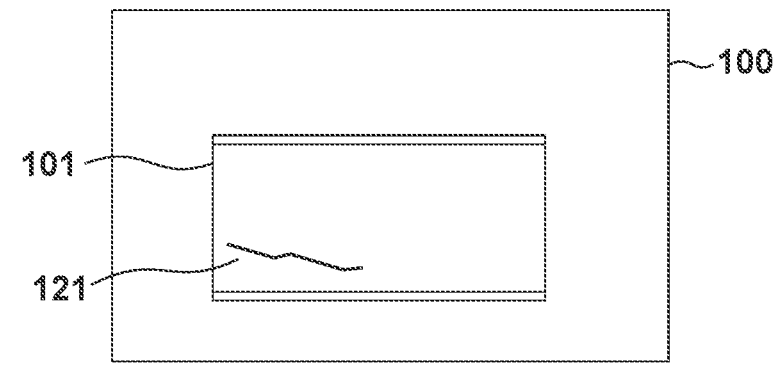
FIG. 1D is a diagram for schematically describing an embodiment of the present invention.

FIG. 1A shows a state in which a captured image 101 of a slab of a bridge, which is an example of an infrastructure construction, is pasted on a drawing 100. Since the image 101 is an image captured with a high resolution, the size thereof is very large (the number of pixels is very large), and it is difficult to execute recognition processing as is. In view of this, first, partial images that enable recognition processing to be executed are created. As a method for creating partial image, for example, the original construction image is divided into images having a size that enables recognition processing to be executed. FIG. 1B shows partial images 111, 112, 113, and 114 obtained by dividing the image 101 into images having a size that enables recognition processing to be executed. Next, one partial image for executing recognition processing is specified from the partial images 111, 112, 113, and 114. The selecting may be performed in any order. The partial image 113 positioned at the bottom left is selected from the image 101 before being divided, for example. Recognition processing is then performed in the selected partial image 113, and a recognition result, namely a crack or the like is acquired. FIG. 1C shows a state where recognition processing is performed in the partial image 113, and an acquired recognition result 121 is superimposed thereon. Processing for returning the recognition result to the drawing is then performed. FIG. 1D shows a state where the image 101 and the recognition result 121 are pasted on the drawing 100. In a case of comprehensively acquiring recognition results from the entire construction image, recognition processing is repeatedly executed while changing a position at which a partial image is created. In this manner, when a captured image of a construction is very large and it is difficult to execute recognition processing as is, it is possible to execute recognition processing, and acquire and manage recognition results associated with a drawing.

Information Processing Apparatus

Figure 2A:
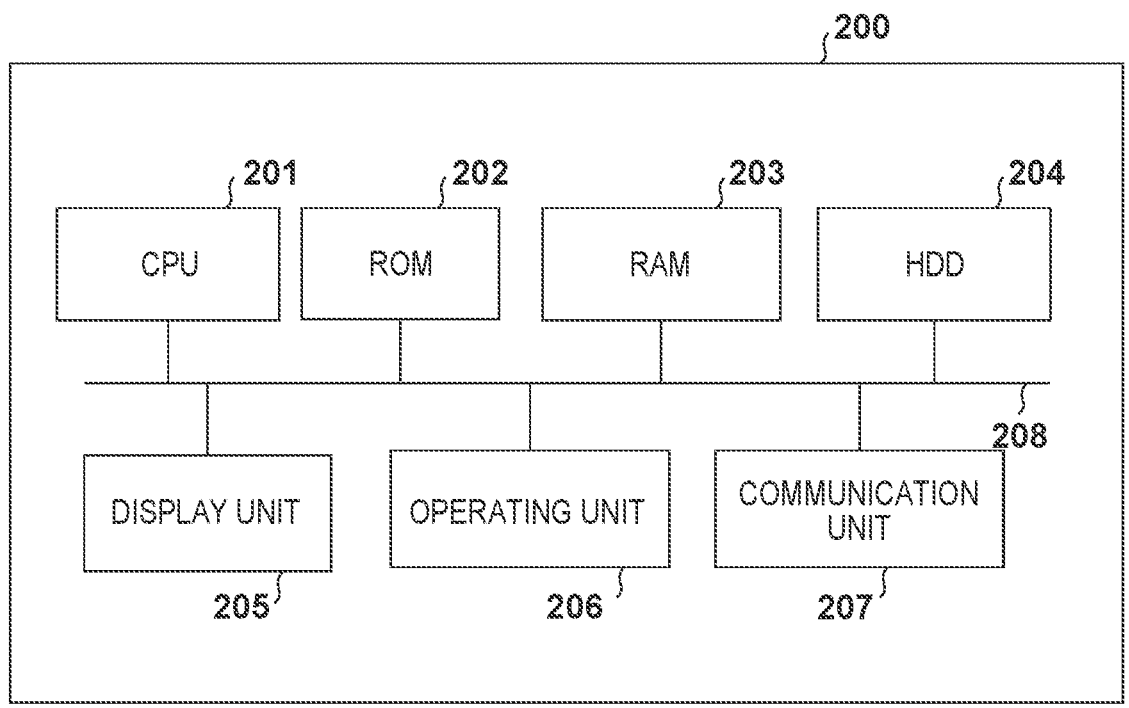
FIG. 2A is a diagram of a hardware configuration of an apparatus according to an embodiment of the present invention.

FIG. 2A is a diagram of a hardware configuration of an information processing apparatus 200 according to the present embodiment. As shown in FIG. 2A, the information processing apparatus 200 includes a CPU 201, a ROM 202, a RAM 203, an HDD 204, a display unit 205, an operating unit 206, and a communication unit 207. The CPU 201 is a central processing unit, performs computation, logical judgment, and the like for performing various types of processing, and controls constituent elements connected to a system bus 208. The ROM (Read-Only Memory) 202 is a program memory, and holds a program for control that is performed by the CPU 201, the program including various processing procedures to be described later. The RAM (Random Access Memory) 203 is used as a temporary storage region such as a main memory, a work area, or the like of the CPU 201. Note that the program memory may be realized by loading a program from an external storage apparatus or the like connected to the information processing apparatus 200, to the RAM 203.

The HDD 204 is a hard disk for storing electronic data and a program according to the present embodiment. An external storage apparatus may also be used as an apparatus that performs a similar role. Here, the external storage apparatus can be realized by, for example, a medium (recording medium) and an external storage drive for realizing access to the medium. An flexible disk (F D), a CD-ROM, a DVD, a USB memory, an MO, a flash memory, and the like are known as examples of such a medium. Moreover, the external storage apparatus may also be a server apparatus or the like connected by a network.

The display unit 205 is a CRT display, a liquid crystal display, or the like, and is a device for outputting an image to a display screen. Note that the display unit 205 may be an external device that is connected to the information processing apparatus 200 by wire or wirelessly. The operating unit 206 includes a keyboard and a mouse, and accepts various operations performed by the user. The communication unit 207 performs, wired or wireless bidirectional communication with another information processing apparatus, a communication device, an external storage apparatus, or the like, using a known communication technique.

Functional Block Diagram

Figure 2B:
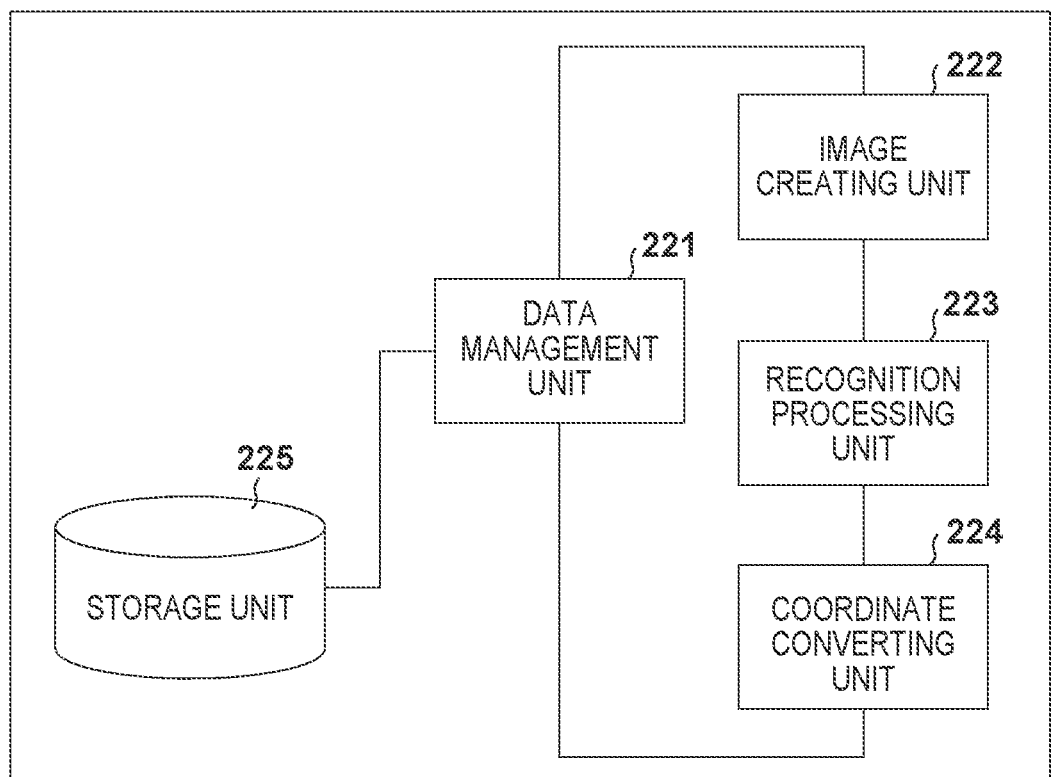
FIG. 2B is a diagram of functional blocks of an apparatus according to an embodiment of the present invention.

FIG. 2B is an example of a block diagram showing a function configuration of the information processing apparatus 200. These function units are realized by the CPU 201 loading a program stored in the ROM 202 to the RAM 203, and executing processing that is based on the flowcharts to be described later. The CPU 201 then causes the RAM 203 to hold execution results of the processing. In addition, for example, when hardware is configured in place of software processing that uses the CPU 201, it is sufficient that computation units or circuits that correspond to processing of the function units described here are configured.

A data management unit 221 manages a first image and recognition results stored in a storage unit 225 (corresponding to the HDD 204) and associated with global coordinates. An image creating unit 222 creates a second image from the first image, and also creates the relationship between the second image and the global coordinates. A recognition processing unit 223 executes recognition processing in the second image using a trained model, and creates a recognition result using the local coordinate system of the second image. A coordinate converting unit 224 performs processing for converting the recognition result from the local coordinates into the global coordinates. The recognition result converted into the global coordinates is stored in the storage unit 225 by the data management unit 221.

Relationship Between Global Coordinates and First Image

In order to describe the present embodiment, global coordinates and a first image will be described.

Figure 3A:
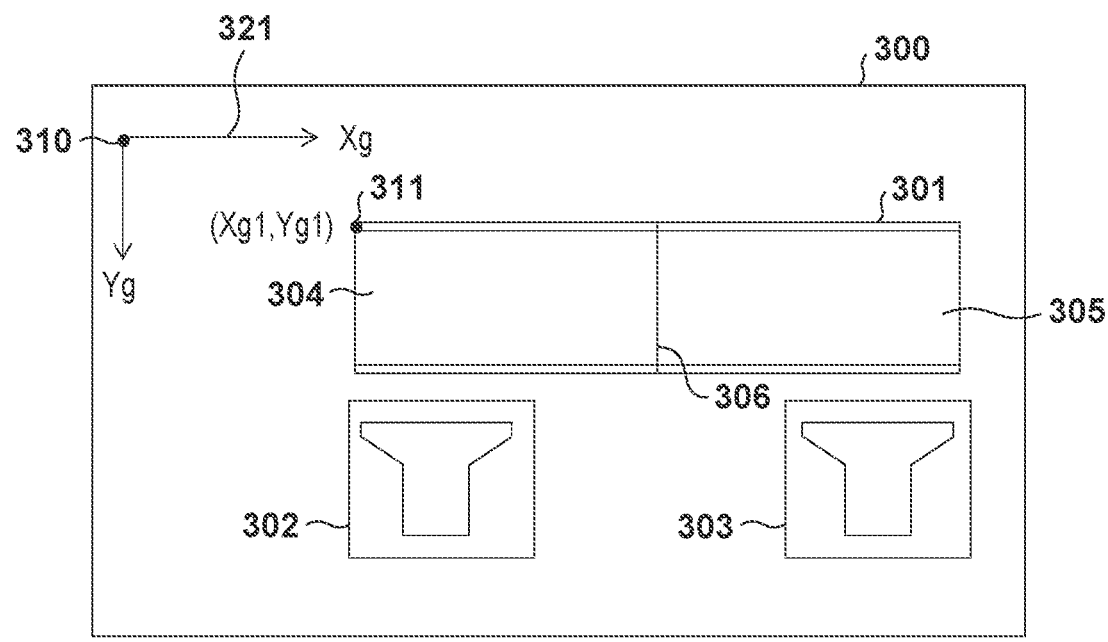
FIG. 3A is a diagram for describing global coordinates and a first image.

In image inspection, a captured image of a wall surface of a construction is preferably managed in association with a drawing. FIG. 3A shows a state where captured images 301, 302, and 303 of a wall surface of a bridge, which is an example of an infrastructure construction, are pasted on a drawing 300. Here, the image 301 is an image in which captured images 304 and 305 of slabs of the bridge are coupled to each other side by side, and the image 302 and the image 303 are individual images of piers. The drawing 300 has drawing coordinates 321 in which a point 310 serves as an origin. In the present embodiment, the drawing coordinates 321 are referred to as "global coordinates", and the images 301, 302, and 303 are referred to as "first images". The position of a first image on the global coordinates is defined using the coordinates of the vertex at the top left of the image. The coordinates of the image 301 are indicated by the position (Xg1, Yg1) of a vertex 311, for example. The first images are stored in the storage unit 225 along with the coordinate information thereof.

Figure 3B:
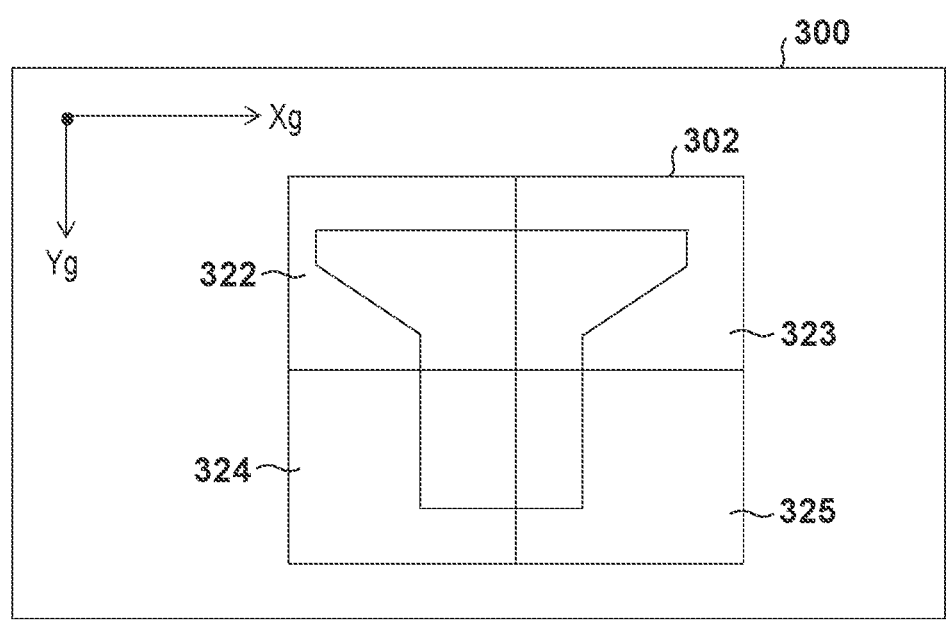
FIG. 3B is a diagram for describing global coordinates and a first image.

An image that is used for image inspection of an infrastructure construction is captured with a high resolution (e.g., 1 mm per pixel) such that a minute crack and the like can be checked, and thus the size of the image is very large. The image 301 in FIG. 3A is assumed to be a captured image of a slab of a bridge that is 20 m in the horizontal direction and 5 m in the vertical direction, for example. In this case, when the image resolution is 1 mm per pixel (1 mm/pixel), the size of the image 301 is 20,000 pixels×5,000 pixels. It takes time to read out an image having a large size, and thus, for example, in order to parallelize read-out processing, the first image may be divided and stored in advance as in FIG. 3B. The image 302 in FIG. 3B shows a state where divided images 322, 323, 324, and 325 obtained by dividing an image of a wall surface to have the same size are arranged on the drawing 300. When a first image is divided and stored, there is a need to store position coordinates of each divided image on the global coordinates.

Flowchart

Figure 4:
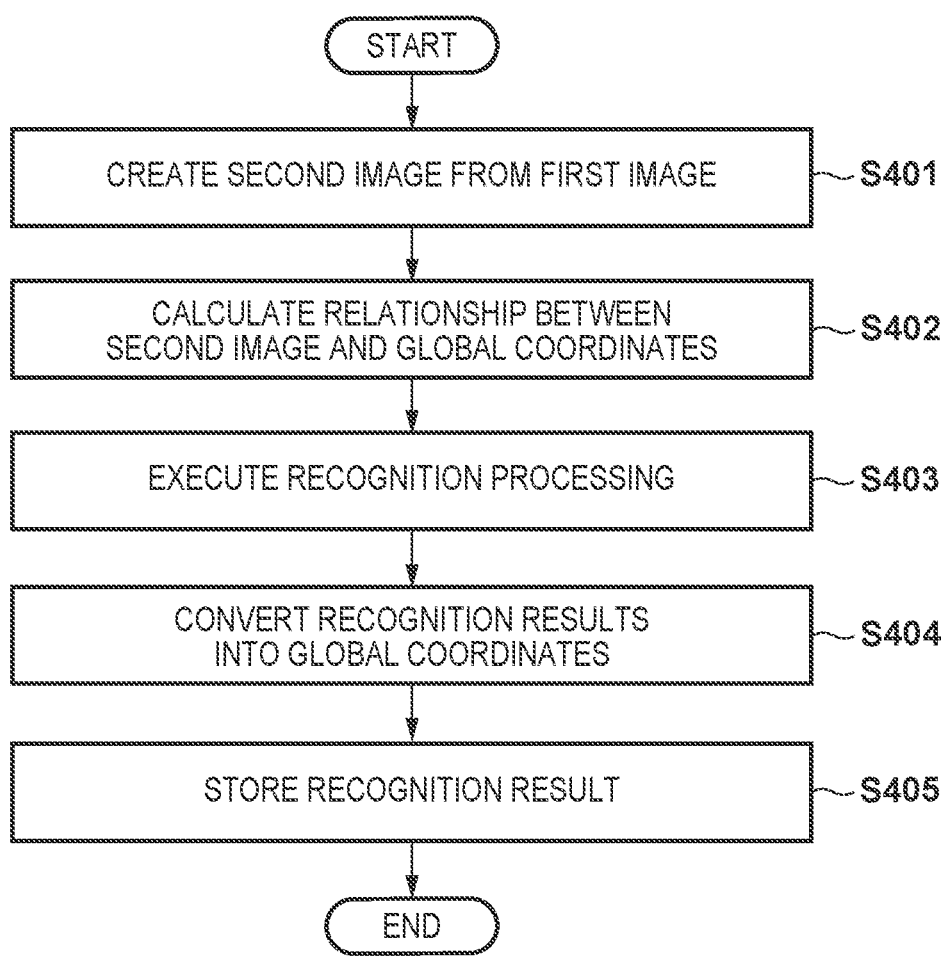
FIG. 4 is a flowchart showing a processing procedure according to an embodiment of the present invention.

FIG. 4 is a flowchart indicating a flow of main processing that is performed by the information processing apparatus according to the present embodiment. Hereinafter, "S" is added to the beginning of the reference numeral of each process (step), and a description thereof will be given. In the present embodiment, a first image is an image of an entire construction (hereinafter, "entire image") associated with a drawing, and global coordinates refer to the drawing coordinates of the construction. A second image is a partial image created from the first image, and local coordinates are image coordinates corresponding to the partial image. In the present embodiment, the operating unit 206 accept input for a start of recognition processing, and processing of the flowchart in FIG. 4 starts. When storing of recognition results is complete, the procedure ends.

Creation of Second Image

First, in step S401, the image creating unit 222 creates a second image from a first image. The second image is a partial image obtained by specifying a range suitable for recognition from the first image, and the image creating unit 222 executes processing for determining this range. Examples of a method for determining a range suitable for recognition includes a method for determining a range based on the restraints of the memory of the information processing apparatus and the like. In the present embodiment, in step S403, which will be described later, the recognition processing unit 223 reads out, to the RAM 203, an image on which recognition processing is to be executed, and executes recognition processing. That is, the upper limit of the image size that enables recognition processing to be executed depends on the size that is allowed to be read out to RAM 203. In view of this, in an embodiment of the present invention, the image size that is allowed to be read out is determined based on the capacity of the RAM 203, and a range suitable for recognition is determined.

Figure 5A:
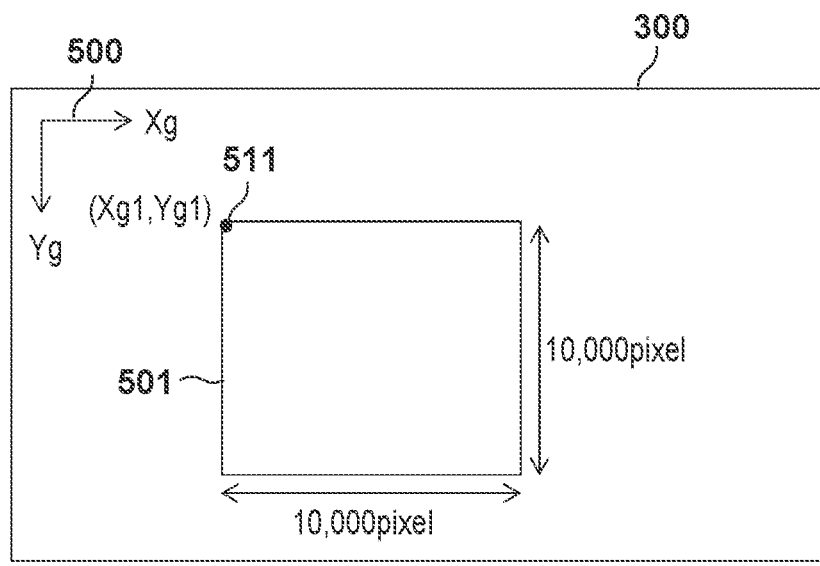
FIG. 5A is a diagram for describing an example of creating a second image according to an embodiment of the present invention.
Figure 5B:
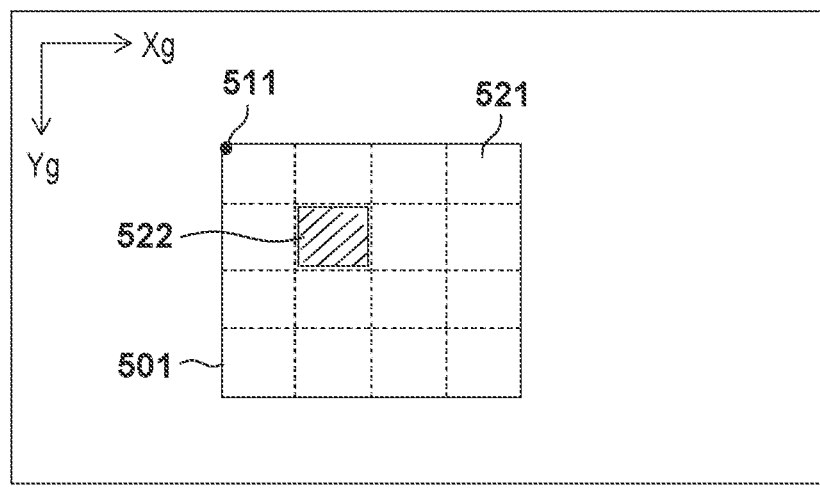
FIG. 5B is a diagram for describing an example of creating a second image according to an embodiment of the present invention.
Figure 5C:
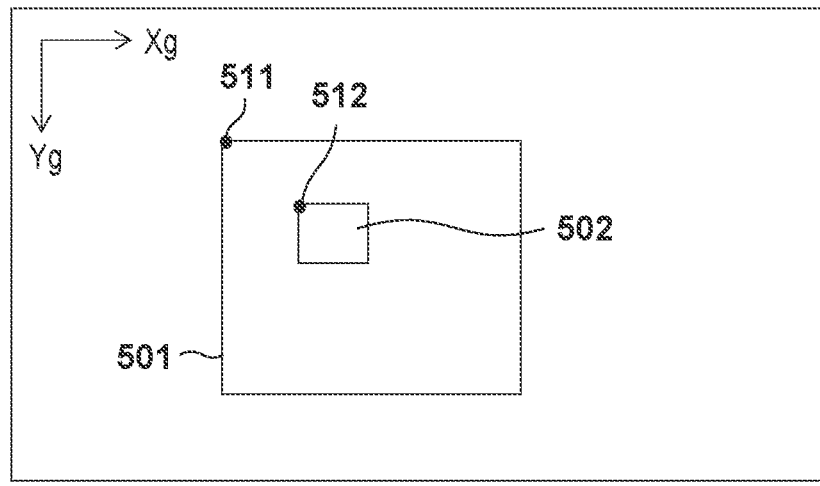
FIG. 5C is a diagram for describing an example of creating a second image according to an embodiment of the present invention.

FIGS. 5A to 5C show an example of creating a second image. FIG. 5A is a diagram showing a state in which a first image 501 is pasted on the drawing 300. This drawing 300 has global coordinates 500. The coordinate position of the first image 501 is defined by the vertex 511 (Xg1,Yg1), and the size thereof is 10,000 pixels×10,000 pixels. At this time, first, the image creating unit 222 acquires the resources of the device related to the processing, specifically, the capacity of the RAM 203, and obtains the upper limit of the image readout size (for example, 2500 pixels×2500 pixels). Next, the first image 501 is divided into regions in accordance with the upper limit of the size that is allowed to be read out. FIG. 5B shows a state where a first image is divided, and a dotted grid 521 indicates division lines. One region is specified from the plurality of divided regions, and is assumed to be a range suitable for recognition. A method for selecting one region from a plurality of regions may be a method in which the user specifies one region. Assuming that, for example, a region 522 in FIG. 5B is specified by the user, the operating unit 206 accepts input from the user. The image creating unit 222 then sets the region 522 as a range suitable for recognition processing, based on the accepted input. The method for selecting one region from a plurality of regions may also be another method. When acquiring recognition results from the entirety of the first image, for example, recognition processing is executed on all of the second images that are created from the first image. In view of this, a configuration may also be adopted in which a plurality of region are automatically selected in order from an end, and recognition processing is sequentially executed.

In this manner, a configuration can be adopted in which the image size allowed to be read out is obtained based on the capacity of the RAM 203, a range suitable for recognition processing is set, and a second image is created. FIG. 5C shows the positional relation between the first image 501 and a created second image 502. The position of the image 502 is defined as the coordinates of a vertex 512. The coordinates of the vertex 512 indicate a position shifted from the position of a vertex 511 by 2,500 pixels in the axial directions of the global coordinates 500. The shape of a divided region obtained by dividing a first image may be any shape that is smaller than or equal to the size of the first image, and is smaller than or equal to the image size allowed to be read out to the RAM 203. The shape of a rectangular of 1,250 pixels×5,000 pixels may be adopted, for example.

Moreover, the size of a second image may be dynamically determined in accordance with the free memory size (available memory size) of the RAM 203. In particular, if the information processing apparatus 200 shown in FIG. 2 is a general-purpose information processing apparatus represented by a personal computer, an OS (operating system) is loaded in the RAM 203. In addition, another application or a resident program may also be held in the RAM 203. In view of this, a configuration may also be adopted in which, at an initial stage when an application program illustrated in the present embodiment is loaded in the RAM 203 and execution of the program is started, the available memory size of the RAM 203 is obtained, the upper limit size of an image for recognition processing is determined based on the obtained available memory size, and the size of a second image is determined within the upper limit size.

Figure 6A:
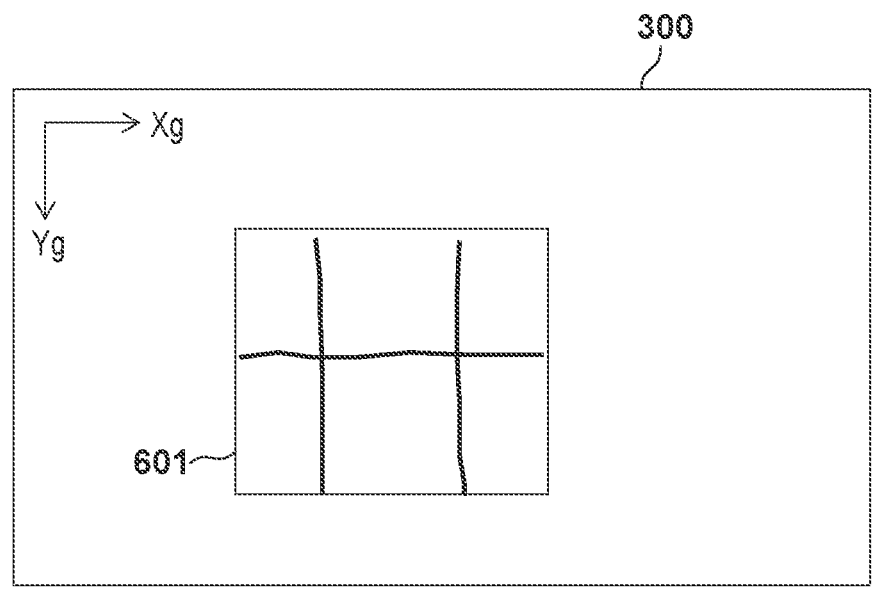
FIG. 6A is a diagram describing an example of creating a second image.
Figure 6B:
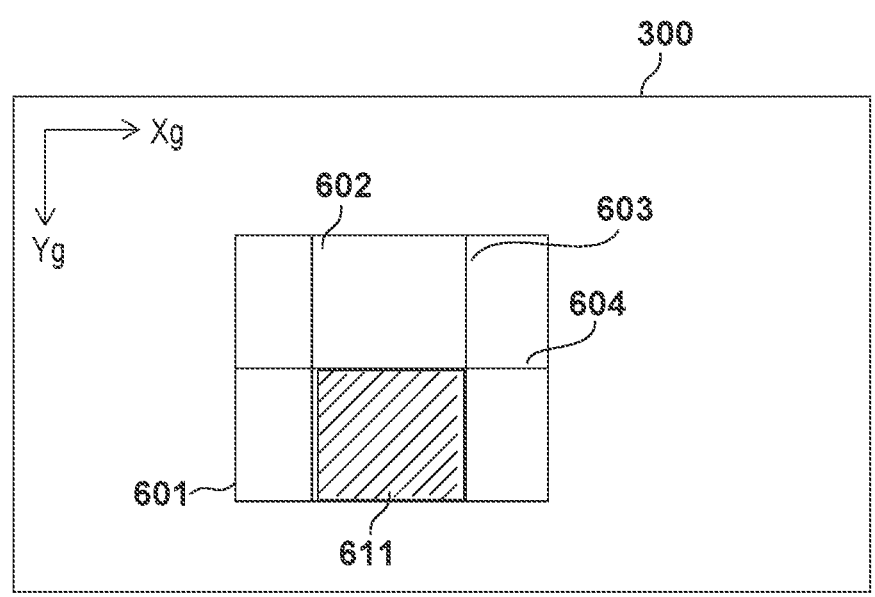
FIG. 6B is a diagram describing an example of creating a second image.

Examples of another method for determining a range suitable for recognition from a first image include a method for using a masonry joint, a joining portion between members, or the like in the construction as a boundary. A crack, which is a recognition target, is less likely to extend across a masonry joint. In addition, in inspection in an image of a concrete wall surface, a metal member in the construction is not an inspection target in most cases. Therefore, a masonry joint and a joining portion between members in the construction are suitable as a boundary for determining a range suitable for recognition. Processing for determining a range suitable for recognition using a masonry joint or the like in the construction as a boundary will be described with reference to FIGS. 6A and 6B. FIG. 6A is a diagram in which a captured image 601 of a concrete wall surface is pasted on the drawing 300. The image 601 shows a construction that includes masonry joints in the horizontal direction and the vertical direction. In this image 601, a line segment indicating a masonry joint is acquired using image processing. Examples of a method for determining a line segment of a masonry joint or the like include a method for acquiring line components using image processing. First, an edge extraction technique such as the Canny method is applied to the image, and an edge image is acquired. Next, Hough transform processing is performed on the created edge image, and a line is acquired. This line is regarded as a boundary such as a masonry joint. FIG. 6B is a diagram in which the image 601 and acquired line segments 602, 603, and 604 are displayed and superposed on the drawing 300. The image 601 is divided into a plurality of regions by the line segments 602, 603, and 604. One region is selected from the plurality of divided regions as a second image. A method for selecting one region from a plurality of divided regions may be any method, but, similarly to description given with reference to FIGS. 5A to 5C, the user specifies a region 611, for example. When the user specifies a region, the operating unit 206 accepts input from the user. The image creating unit 222 then determines the region 611 as a range suitable for recognition, based on the accepted input, and creates a second image. In this manner, a second image can be created using a boundary such as a masonry joint as a range suitable for recognition. Another method may also be used as a method for determining a boundary such as a masonry joint, a joining portion between members, or the like in a construction. A region is divided according to a similar texture based on the spatial frequency information of an image that is obtained through FFT, for example. This dividing boundary may be a masonry joint or a joining portion between members. At this time, a configuration may be adopted in which a recognition method is switched, for example, by changing a learning model that is used, for each second image divided according to a texture, and recognition processing is executed. Also, the user may directly specify a masonry joint or the like. When the user specifies a masonry joint or the like, the user inputs the position and the shape of a masonry joint or the like while checking the first image displayed on the display unit 205. The operating unit 206 accepts input from the user, and the image creating unit 222 acquires the accepted input as a boundary such as a masonry joint.

As another method for determining a range suitable for recognition from a first image, a plurality of methods may also be used in combination. A method for determining a range suitable for recognition based on the restraints of the memory of the information processing apparatus and the like and a method for using a masonry joint, a joining portion between members, or the like in a construction as a boundary may be combined, for example. First, a boundary such as a masonry joint is acquired from the first image, and the first image is divided into a plurality of partial images. Next, each of the partial images is divided to have a size that enables recognition processing to be executed, based on the RAM size. In this manner, by combining a plurality of methods, it is possible to create a partial image having a size that enables reliable recognition processing to be executed, using a masonry joint of a construction as a boundary.

When the first image is constituted by a plurality of captured images, a boundary between images may be used as a boundary of a range suitable for recognition. When the shooting condition changes, color, focus, and the like of an image change, and thus a crack or the like in an image of the construction appears differently. Therefore, a shooting boundary is suitable as a boundary for determining a range suitable for recognition processing. The image 301 in FIG. 3A is, for example, an entire image in which the image 304 and the image 305 that have been individually captured are coupled so as to not overlap. A shooting boundary (image boundary) 306 between the image 304 and the image 305 may also be used as a boundary when determining a range suitable for recognition. Alternatively, a configuration may also be adopted in which the image 304 and the image 305 before being coupled are regarded as partial images, and one of them is determined as a second image. Moreover, there are cases where, in order to create a high resolution image of a wall surface, images are captured such that a portion of each shooting range overlap a portion of another shooting range, and a plurality of captured images are stitched so as to overlap, whereby a first image is created. In such a case, this stitch boundary may be used a boundary of a range suitable for recognition.

Conversely, there are cases where a first image constituted by one captured image is divided into a plurality of small images and stored in the storage unit 225, for data management. In such a case, a division boundary between small images may be used as a boundary of a range suitable for recognition. One small image may be determined as a second image, or an image in which two or more small images are coupled may be determined as a second image. The image 302 in FIG. 3B is divided into four divided images (322, 323, 324, and 325), and is stored, for example. The divided image 324 may be selected from these divided images, and determined as a second image, or an image in which the divided images 323 and 325 are coupled may be determined as a second image, for example.

Calculation of Relationship Between Second Image and Global Coordinates

Figure 7:
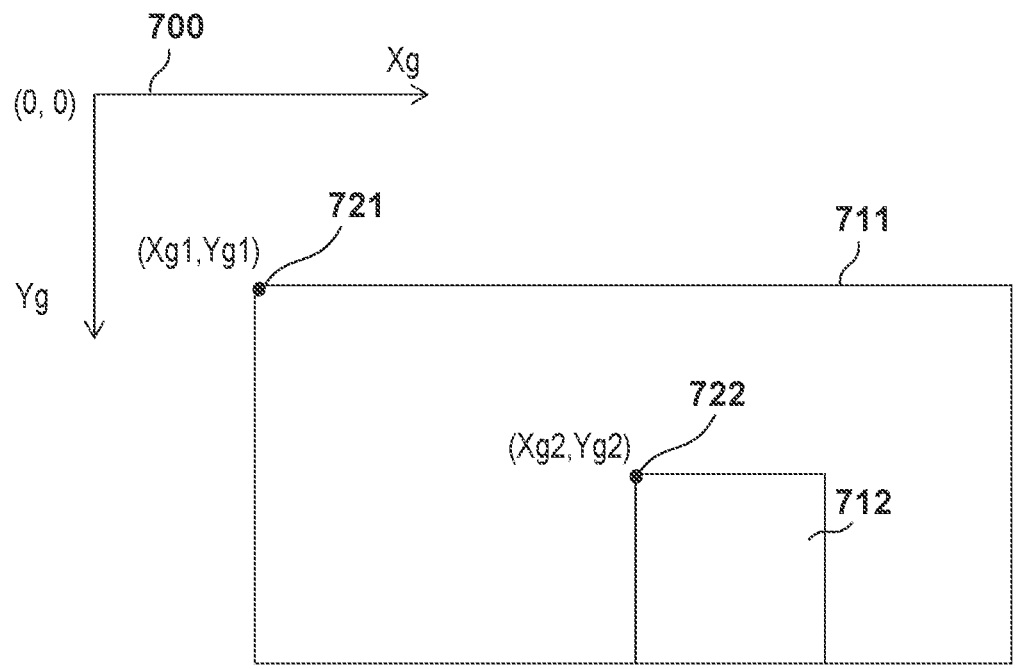
FIG. 7 is a diagram showing the relationship between a second image and global coordinates.

In step S402, the image creating unit 222 calculates the position of the second image on the global coordinates. In order to calculate the position of the second image, position information of the first image on the global coordinate and information regarding the positional relation between the first image and the second image are used. The position of the first image on the global coordinates is indicated by the coordinates of the top-left vertex of the image, and is known in the present embodiment. The positional relation between the first image and the second image is obtained based on the image resolution and the numbers of pixels in the axial directions between the top-left vertexes of the images. A method for calculating the position of the second image on the global coordinates using such information will be described with reference to FIG. 7. Note that the unit of the global coordinates is m (meter), and the image resolution indicates the size of the wall surface of the real construction in the image, and is a constant R (mm/pixel) here. FIG. 7 is a diagram in which a first image 711 and a second image 712 associated with global coordinates 700 are displayed. The position of the first image 711 is indicated by a top-left vertex coordinates 721 (Xg1, Yg1) of the image. In addition, the position of the second image 712 is indicated by a top-left vertex coordinates 722 (Xg2, Yg2) of the image. In addition, the numbers of pixels (number of distance pixels) in the axial directions between the vertex coordinates 721 and the vertex coordinates 722 is indicated by (Xp,Yp). At this time, the vertex coordinates 722 (Xg2, Yg2) of the second image on the global coordinates are expressed by Expressions 1 and 2 below.

$$Xg2=Xg1+(Xp \times R \times 0.001) \quad (1)$$

$$Yg2=Yg1+(Yp \times R \times 0.001) \quad (2)$$

The numerical value 0.001 in Expressions 1 and 2 is a transform coefficient for performing unit conversion from mm (millimeter) for the image resolution into m (meter) for the global coordinate. This transform coefficient changes in accordance with the unit of the image resolutions or the global coordinates. It is possible to obtain the position of the second image on the global coordinates by using Expressions 1 and 2.

Execution of Recognition Processing

In step S403, the recognition processing unit 223 executes recognition processing in the second image, and acquires a recognition result. In the present embodiment, as an example, recognition processing when the recognition target is a crack will be described with reference to FIG. 8.

Figure 8:
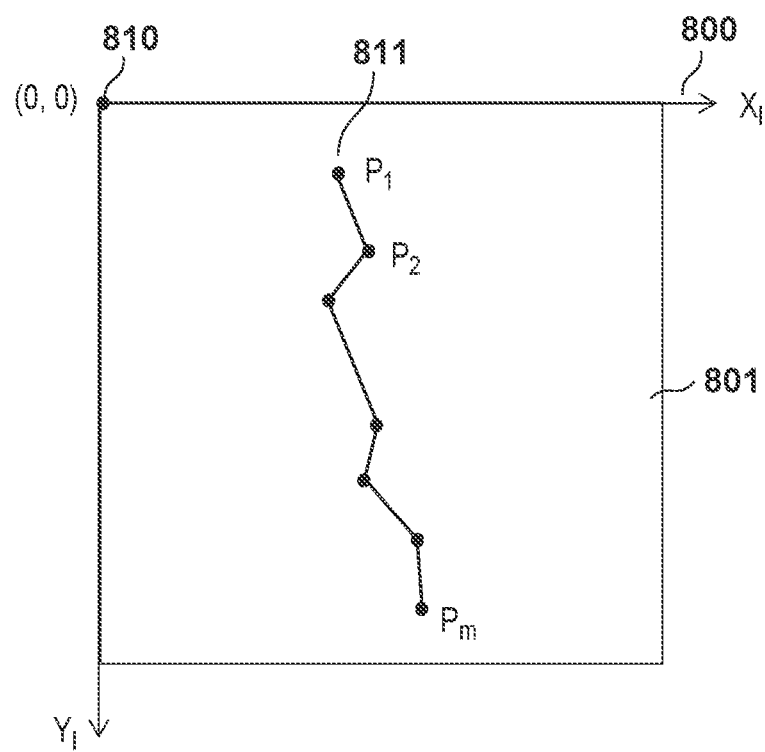
FIG. 8 is a diagram for describing a recognition result in a second image.

FIG. 8 is a diagram in which a second image 801 associated with local coordinates 800 and a crack 811 that is an acquired recognition result are superimposed. The local coordinates are image coordinates associated with the second image. To facilitate description, a top-left vertex 810 of the second image is assumed to be an origin of the local coordinates 800. The crack 811 is output as vector data, and includes points P1 to Pm. The points P1 to Pm of the crack 811 have position coordinates that are local coordinates, and represent a crack when connected by lines. Note that the crack 811 may be output as raster data. When a crack is acquired as raster data, a group of points on the local coordinates represents a crack.

Recognition processing that is executed in step S403 can be executed using a trained model trained through machine learning in advance, for example. The trained model can be configured by a neural network model, for example. A configuration may be adopted in which a trained model trained using different training data is prepared for each type of crack, and use of a trained model is switched for each crack that is desired to be recognized, or a general-purpose trained model capable of recognizing various types of cracks may also be used. In addition, use of a learning model may be switched based on texture information of the second image. Examples of a method for obtaining texture information from the second image include a determining method that is based on spatial frequency information of an image that is obtained through FFT. In addition, a technique for recognizing a crack is not limited to this, and a method that uses image processing may also be adopted. For example, Patent Document 2 discloses a method for detecting a crack through wavelet transform. In addition, a recognition result, namely a deformation such as a crack, is not limited to vector data, and may also be raster data.

Recognition processing in step S403 may also be executed in parallel. Executing recognition processing in step S403 in parallel is a suitable processing method. When parallel processing is performed, one second image is created from the first image, and position information of global coordinates is calculated, in steps S401 and S402. Processing in these steps S401 and S402 is repeated, and a plurality of second images are created. The recognition processing unit 223 then executes recognition processing on the created second images in parallel, and acquires recognition results of the respective images. The acquired recognition results are output as vector data of local coordinates associated with the respective second images.

Conversion of Recognition Result/s into Global Coordinates

In step S404, the coordinate converting unit 224 performs processing for converting the recognition results associated with the local coordinates into the global coordinates. As an example in which coordinate conversion is performed on recognition results, processing for converting the coordinates of the points P1 to Pm of the vector data of the crack 811 in FIG. 8, into the global coordinates will be described. The coordinates of the points P1 to Pm are assumed to be coordinates (Xlp1,Ylp1) to (Xlpm,Ylpm) associated with the local coordinates. At this time, coordinates (Xgp1,Ygp1) to (Xgpm,Ygpm) of the points P1 to Pm converted into the global coordinates can be obtained using Expressions 3 and 4.

$$Xgpi = Xg2 + (Xlpi \times R \times 0.001)(pi = p1, p2, \ldots, pm) \quad (3)$$

$$Ygpi = Yg2 + (Ylpi \times R \times 0.001)(pi = p1, p2, \ldots, pm) \quad (4)$$

"R" in Expressions 3 and 4 is a parameter indicating the image resolution of the first image, and takes a numerical value in the units of mm/pixel. The numerical value 0.001 at the end is a transform coefficient for performing unit conversion from mm to m. This transform coefficient changes in accordance with the unit of image resolution and the unit of global coordinates in the same manner as the transform coefficient in Expressions 1 and 2. Xg2 and Yg2 indicate the position of the second image on the global coordinates (the coordinates of the top-left vertex of the image) that are calculated using Expressions 1 and 2. It is possible to convert a recognition result on the local coordinates into the global coordinates by using Expressions 3 and 4.

Storing of Recognition Results

Figure 9:
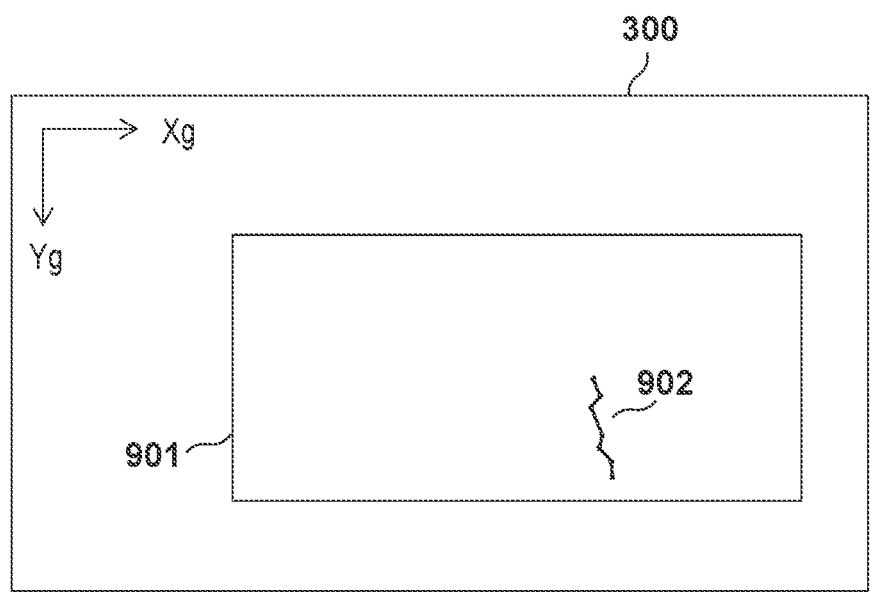
FIG. 9 is a diagram for describing an example in which an image and a recognition result are managed in association with a drawing.

In step S405, the data management unit 221 performs processing for storing the recognition result converted into the global coordinates, in the storage unit 225. The recognition result has coordinates associated with the global coordinates, in other words drawing coordinates of the entire construction, and thus the recognition result can be recorded and managed in association with the drawing and the first image. FIG. 9 shows a state where the drawing 300 and a first image 901 associated with the drawing, and a recognition result 902 are displayed.

Variation of First Embodiment

So far, in the first embodiment, an embodiment has been described in which recognition results are acquired for respective partial images, and are sequentially subjected to coordinate conversion. However, processing for accumulating recognition results of a plurality of partial images, collectively performing coordinate converting, and associating the recognition results with a drawing may also be performed. Recognition results before coordinate conversion are held in the HDD 204 or the like along with a coordinate converting parameter. When the user references a recognition result, for example, the recognition result and the coordinate converting parameter are read. Coordinate conversion processing is then executed only on the recognition result required for referencing, a recognition result associated with the drawing is acquired. It is possible to reduce the number of times of coordinate converting processing by collectively performing coordinate conversion in this manner.

Example of Application to Other Field

In the above embodiment, an embodiment has been described in which a recognition result in a captured image of an examination target in infrastructure inspection is associated with a drawing and is managed. However, a field to which the present embodiment is applied is not limited to a specific field. The present embodiment is also effective for examination inspection processing that uses a super-resolution image, for example. Specifically, the present embodiment is effective for a semiconductor wafer examination process in a factory. In an examination process of a semiconductor wafer, a defect such as a scratch is recognized in a captured image of a semiconductor wafer, and the recognition result is associated with the drawing and is managed. In order to recognize a minute scratch on a semiconductor wafer, there is a need to execute recognition processing on an image captured with a super-high resolution, and thus the image size is very large. Therefore, it is difficult to execute recognition processing on the entire image at a time. Therefore, partial images are extracted from the entire image, and recognition processing is executed for each partial image at a time. Incidentally, in a semiconductor wafer manufacturing process, a circuit pattern is regularly printed so as to follow grid-like boundaries on the wafer surface, and dicing is then performed along the boundaries. Accordingly, using grid-like boundaries as separation when creating partial images in which recognition processing can be executed is a suitable method. It is possible to easily manage defect information of the entire wafer by performing coordinate conversion of a recognition result of a scratch or the like acquired for each partial image, into a drawing.

According to the first embodiment described above, recognition processing can be executed when the image size of a construction is very large and it is difficult to execute recognition processing on the construction image. In addition, recognition results acquired through recognition processing can be recorded and managed in association with the construction drawing.

Second Embodiment

In the above first embodiment, an example has been described in which a recognition result is acquired for each partial image and is managed in association with a drawing. When a deformation is present across a boundary between partial images, recognition results in which the deformation is discontinuous in the vicinity of the boundary of the partial images are obtained. Therefore, the user corrects the discontinuity in the recognition results while comparing the results with the image. In the second embodiment, an example is illustrated in which recognition results in the vicinity of a boundary between partial images are combined, and discontinuity in the recognition results is prevented. Specifically, in recognition results that includes data in the vicinity of a boundary between partial images, and are associated with different partial images, processing for regarding recognition results whose positions are close, as recognition results of the same deformation, and combining the recognition results is performed. Accordingly, recognition results are coupled, and are easily managed and viewed. The second embodiment will be described below with focus on differences from the first embodiment.

Figure 10:
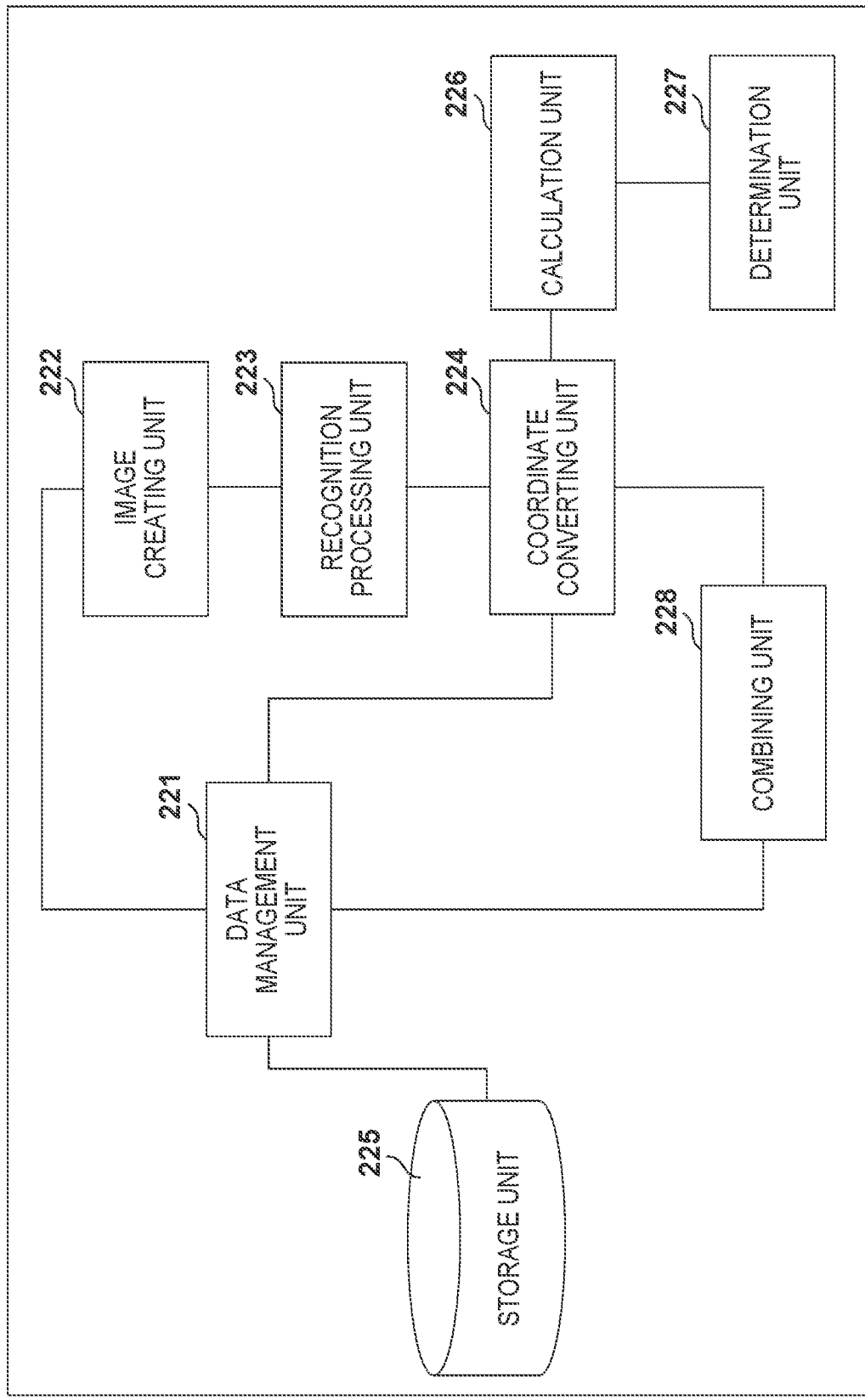
FIG. 10 is a diagram of functional blocks according to a second embodiment.

The hardware configuration of the information processing apparatus 200 according to the second embodiment is based on the configuration of the first embodiment shown in FIG. 2A, and thus a description thereof is omitted. FIG. 10 shows an example of a functional block diagram of the information processing apparatus 200 according to the configuration of the second embodiment. The second embodiment is different from the first embodiment in that a calculation unit 226, a determination unit 227, and a combining unit 228 are added to the configuration of the first embodiment shown in FIG. 2B. The calculation unit 226 is a function unit of the CPU 201, and calculates an index for determining whether or not to combine recognition results converted into the global coordinates. The determination unit 227 is a function unit of the CPU 201, and determines whether or not to combine recognition results, based on the index calculated by the calculation unit 226. The combining unit 228 is a function unit of the CPU 201, and performs processing for combining recognition results based on the determination result made by the determination unit 227.

Figure 11:
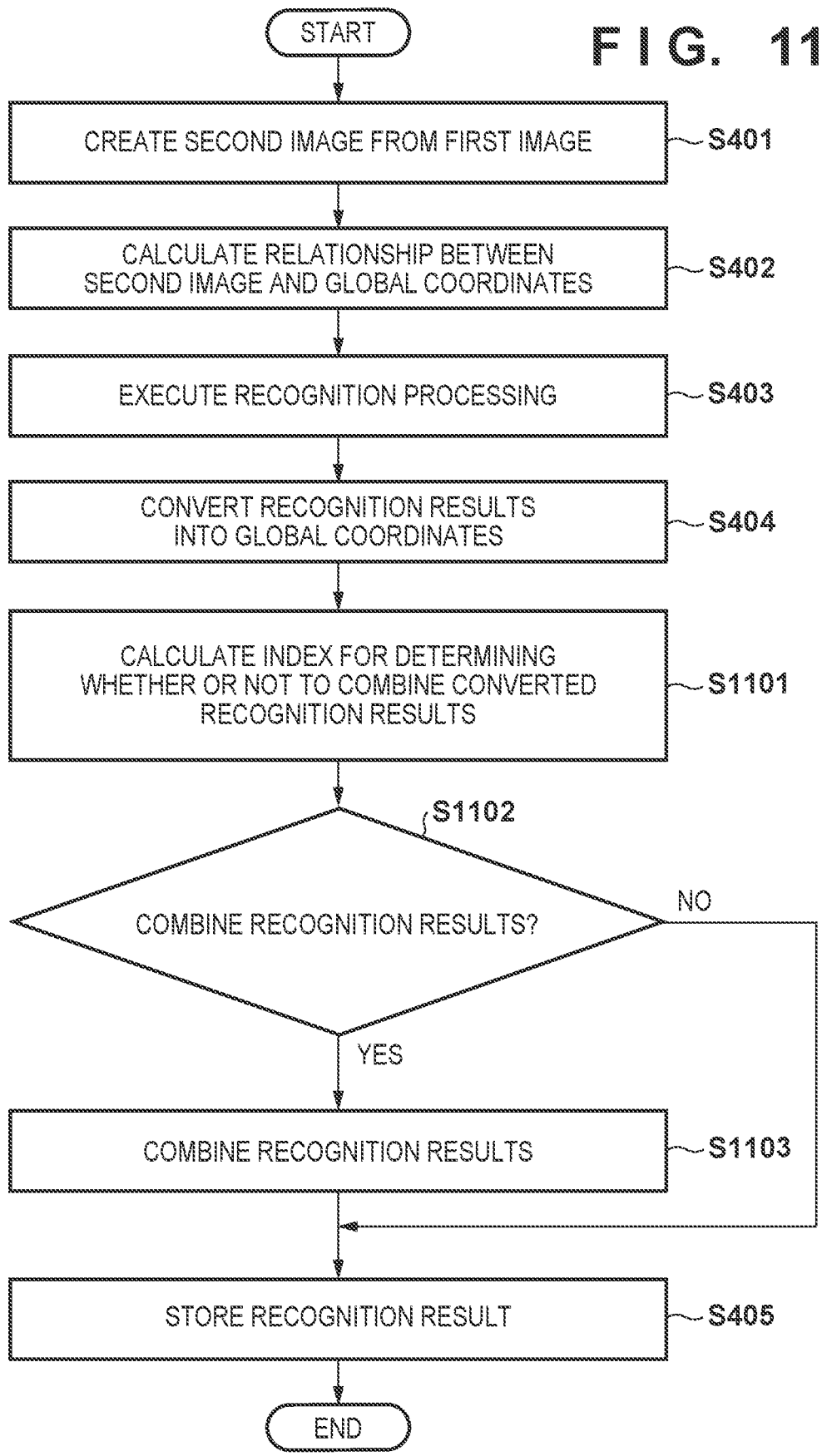
FIG. 11 is a flowchart showing a processing procedure according to the second embodiment.

FIG. 11 is a flowchart showing an example of main processing that is executed by the information processing apparatus 200 according to the second embodiment. In the flowchart in FIG. 11, in steps given the same numerals as those of the flowchart in FIG. 4 described in the first embodiment, processing similar to that in the first embodiment is executed. In the second embodiment, after coordinate converting processing of recognition results is executed in step S404, the procedure advances to step S1101. In the second embodiment, processing for combining recognition results across a boundary between partial images will be described. Therefore, it is based on assumption that processing in steps S401 to S404 is executed on a plurality of partial images, and a plurality of recognition results are acquired.

In step S1101, the calculation unit 226 calculates an index for determining whether or not to combine recognition results in the vicinity of the boundary between images. The calculated index indicates, for example, the distance between the recognition results (it should be noted that the results have already been converted into the global coordinates). In the subsequent step S1102, a determination is performed as to whether or not to combine the recognition results, based on the index calculated in step S1101, and if it is determined that the recognition results are to be combined, the procedure advances to step S1103, where processing for combining the recognition results is executed. If it is determined that the recognition results are not to be combined (No in step S1102), the procedure advances to step S405. In step S1103, processing for combining the recognition results is performed. In step S405, the data management unit 221 then performs processing for storing the recognition results in the storage unit 225, and ends the procedure.

Figure 12A:
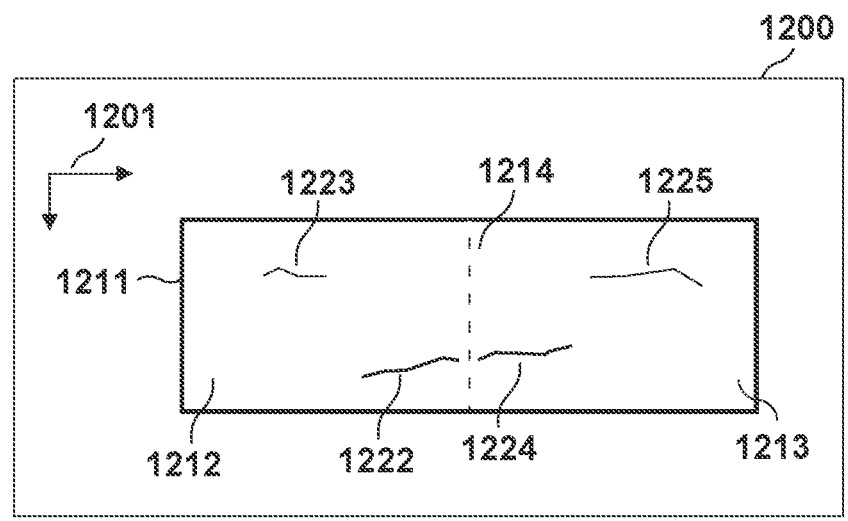
FIG. 12A is a diagram for describing processing for combining recognition results.

Here, processing in step S1101 for calculating an index for determining whether or not to combine recognition results will be described in detail with reference to FIGS. 12A to 12E. A recognition result in the second embodiment is a crack in a surface of a construction similarly to the first embodiment. In step S1101, an index for determining whether or not cracks associated with different partial images may be coupled across the image boundary is calculated. A distance d between the end points of cracks is obtained as the index that is calculated, for example. FIG. 12A is a diagram in which a construction image 1211 and cracks 1222, 1223, 1224, and 1225 are displayed on a drawing 1200. Partial images 1212 and 1213 are partial images of the construction image 1211. The cracks 1222 and 1223 are associated with the partial image 1212, and the cracks 1224 and 1225 are associated with the partial image 1213.

Figure 12B:
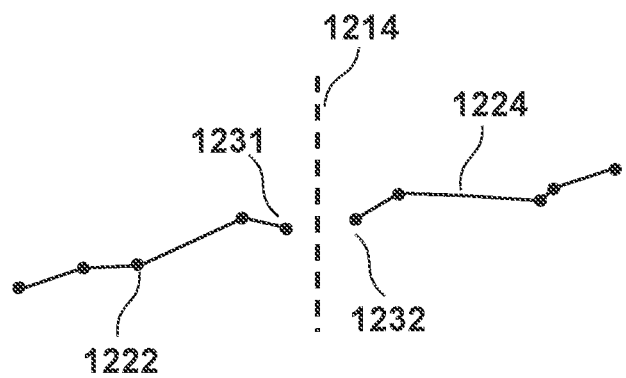
FIG. 12B is a diagram for describing processing for combining recognition results.

In step S1101, a crack that is located at the shortest distance from each crack in the partial image 1212 is searched for among the cracks in the partial image 1213, and the shortest distance is acquired. First, one crack, namely the crack 1222 is selected from the cracks associated with the partial image 1212. Next, one crack, namely the crack 1224 is selected from the cracks associated with the partial image 1213. FIG. 12B is a diagram showing the selected cracks 1222 and 1224. The cracks 1222 and 1224 are vector data, and the position coordinates of each point thereof are converted into the global coordinates in advance. At this time, the distance d between an end point 1231 of the selected crack 1222 and an end point 1232 of the crack 1224 is calculated using Expression 5 below. Expression 5 is a formula for calculating the distance d between end points of cracks that are closest to an image boundary 1214.

$$d = \{(Xg1-Xg2)^2 + (Yg1-Yg2)^2\}^{1/2} \quad (5)$$

"Xg1" and "Yg1" in the formula indicate the position coordinates of the end point 1231, and "Xg2" and "Yg2" are parameters indicating the position coordinates of the end point 1232. Processing for calculating the distance d between end points is executed on each of the cracks in the partial image 1213 while keeping the crack 1222 fixed. Accordingly, a crack in the partial image 1213 that is located at the shortest distance from the crack 1222 is determined, and the shortest distance d at this time is acquired. The above-described processing is repeatedly executed on each of the cracks in the partial image 1212, and the shortest distance corresponding to the crack is acquired.

In a subsequent step S1102, the determination unit 227 determines whether or not to combine cracks, based on the index d (the distance d) calculated in step S1101, for each crack. When the condition of Expression 6 below is satisfied, for example, the determination unit 227 determines that the cracks are to be combined, otherwise the determination unit 227 determines that the cracks are not to be combined.

$$D \geq d \quad (6)$$

"D" in the formula is a constant (threshold value) indicating a reference value for determining whether or not to combine recognition results across an image boundary. An experimentally obtained value is used as this constant D, for example.

In the second embodiment, if the index d calculated in step S1101 satisfies the condition of Expression 6, the procedure advances to step S1103, and processing for combining vector data indicating two cracks when the index d was calculated is performed. In addition, if the condition of Expression 6 is not satisfied, processing for coupling cracks is skipped, the procedure advances to step S405, the data management unit 221 performs processing for storing cracks in the storage unit 225 similarly to the first embodiment, and the processing ends.

Figure 12C:
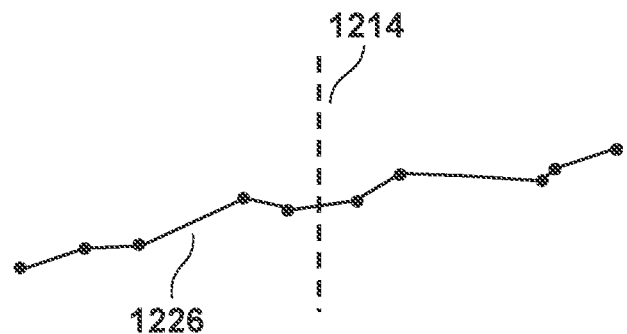
FIG. 12C is a diagram for describing processing for combining recognition results.

In step S1103, the combining unit 228 performs processing for combining recognition results. As an example of processing for combining recognition results, processing for coupling the crack 1222 and the crack 1224 in FIG. 12B will be described. In processing for coupling cracks, end points that are closest to each other are coupled. Accordingly, the end point 1231 and the end point 1232 are coupled. FIG. 12C shows a crack 1226 newly created as a result of coupling cracks. The crack 1226 is a long crack that extends across the boundary 1214 between partial images.

In the above example, the distance between the end point 1232 of the crack 1224 and the end point 1231 of the crack 1222 is calculated in accordance with Expression 5, and is then compared with the threshold value D. However, it is sufficient that the magnitude of the distance between two cracks can be simply determined, and thus the following processing may be performed. First, a distance index d' is obtained in accordance with Expression 5' below in place of Expression 5. A determination is performed as to whether or not to combine cracks, by comparing the obtained index value d' with a threshold value D' corresponding thereto. In a case of Expression 5', as route computation is unnecessary, computation can be simplified, and an increase in the speed of processing can be expected.

$$d' = (Xg1 - Xg2)^2 + (Yg1 - Yg2)^2 \quad (5')$$

In the second embodiment, processing for calculating the distance between end points of cracks, and coupling the cracks if the distance is smaller than or equal to a reference value has been described, but another index may be used. In addition to the distance between end points of cracks, for example, the difference in the orientation of cracks in the vicinity of end points (angle difference) may also be used. In general, a crack does not usually bend steeply in the middle by a large amount. That is to say, it can be said that a crack that is bent largely when obtained by coupling cracks is an unnatural crack. Therefore, by adding, as a condition, determination as to whether or not a change in the angle when cracks are coupled is small, a more natural crack obtained by coupling cracks can be created. Processing for coupling cracks will be schematically described below in which the distance between end points of cracks and a difference in the orientation between the cracks in the vicinity of end points thereof are used as indexes.

Figure 12D:
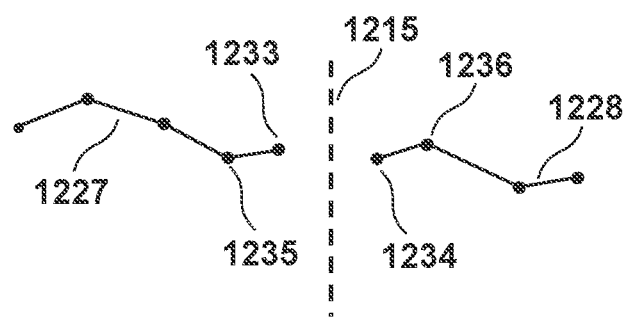
FIG. 12D is a diagram for describing processing for combining recognition results.
Figure 12E:
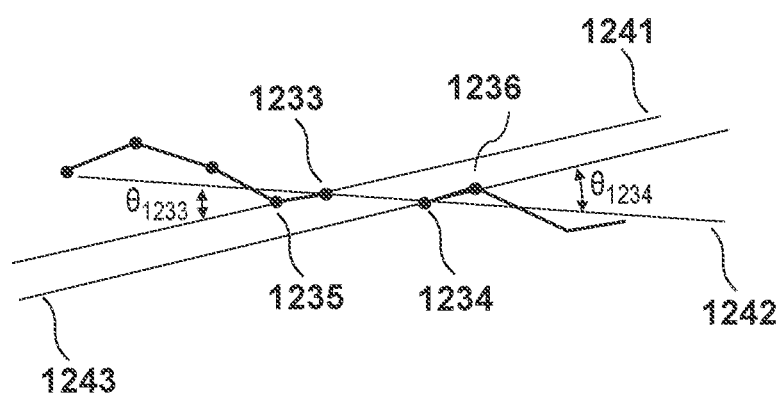
FIG. 12E is a diagram for describing processing for combining recognition results.

First, in step S1101, the calculation unit 226 calculates two indexes. FIG. 12D is a diagram showing a crack 1227 and a crack 1228 associated with different partial images, and an image boundary 1215. First, the calculation unit 226 obtains the distance d between an end point 1233 and an end point 1234 as a first index using Expression 5. Next, the calculation unit 226 obtains, as second indexes, the angles of the cracks when the end point 1233 and the end point 1234 are coupled. FIG. 12E is a diagram showing the angle θ1233 at the end point 1233 and the angle θ1234 at the end point 1234. The angle θ1233 is an angle formed by a line 1241 and a line 1242. Here, the line 1241 is a line that connects the end point 1233 and a point 1235 adjacent to the end point 1233, and the line 1242 is a line that connects the end point 1233 and the end point 1234. Also, the angle θ1234 is an angle formed by the line 1242 and a line 1243. Here, the line 1243 is a line that connects the end point 1234 and a point 1236 adjacent to the end point 1234.

Next, in step S1102, the determination unit 227 determines whether or not to couple recognition results based on the calculated indexes. A determination is performed as to whether or not the distance, which is the first index, is smaller than or equal to a reference value, using Expression 6. A determination is performed as to whether or not both of the angles θ1233 and θ1234, which are the second indexes, are smaller than or equal to a reference angle, using Expression 7 below.

$$\Theta \geq 0 \quad (7)$$

Θ in Expression 7 is a constant (threshold value) indicating the reference angle, and an experimentally obtained value is used, for example.

In step S1102, the determination unit 227 determines whether or not both of the conditions of Expressions 6 and 7 are satisfied. If it is determined that the both of the conditions are satisfied, the determination unit 227 advances the procedure to step S1103. On the other hand, if one of Expressions 6 and 7 is not satisfied, the determination unit 227 advances the procedure to step S405. Combining processing in step S1103 is similar to that described so far, and thus a description thereof is omitted. In this manner, by adding the orientation of a crack as an index, it is possible to execute more natural coupling processing only.

Processing for Combining Recognition Results that have Two-Dimensional Area

In the present embodiment, processing for coupling cracks that have no two-dimensional area, as an example of a recognition result, has been described, but the present embodiment is also effective for recognition results that have a two-dimensional area such as water leakage and floating. Here, assume that recognition results that have a two-dimensional area are vector data. Examples of a method for determining whether or not to couple recognition results that have a two-dimensional area include a method for using a determination as to whether or not portions of boundaries that make up recognition results are close to each other, and the orientations thereof are the same. That is to say, from among line segments that makes up recognition results, a combination of line segments the distance between which is the closest is selected, and the distance between the line segments and an angle formed by the line segments at this time are calculated. If both of the calculated distance and angle are smaller than or equal to reference values, processing for combining recognition results is performed. Processing for calculating an index for determining whether or not to combine recognition results that have a two-dimensional area will be schematically described with reference to FIG. 13.

Figure 13A:
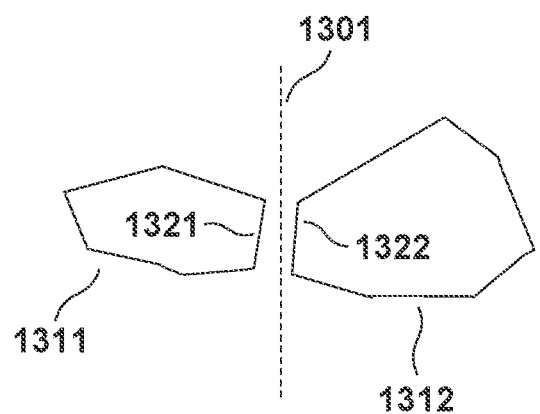
FIG. 13A is a diagram for describing processing for combining recognition results.
Figure 13B:
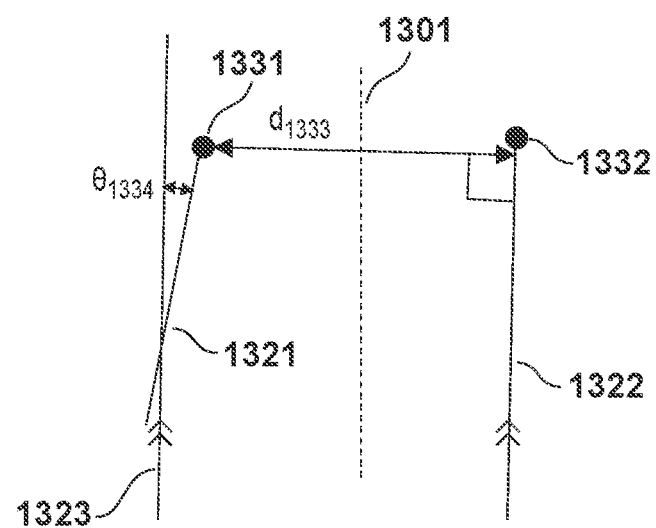
FIG. 13B is a diagram for describing processing for combining recognition results.

FIG. 13A is a diagram in which an image boundary 1301 and recognition results 1311 and 1312 are displayed. First, from among line segments that make up recognition results 1311 and 1312, a combination of line segments the distance between which is the shortest is selected. FIG. 13B shows a line segment 1321 and a line segment 1322 that make up a combination of line segments the distance between which is the shortest. Two indexes are calculated using these two line segments. The first index is the shortest distance between line segments, which is the distance d1333 between an end point 1331 of the line segment 1321 and the line segment 1322, in FIG. 13B. The second index indicates an angle θ1334 formed by the line segment 1321 and a line segment 1323 obtained by moving the line segment 1322 in parallel.

Figure 13C:
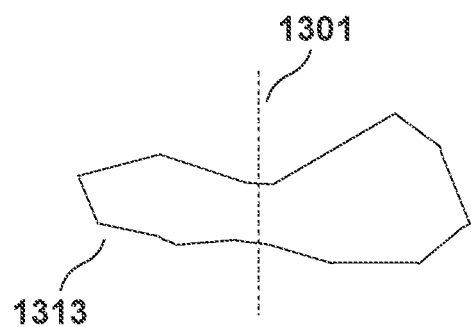
FIG. 13C is a diagram for describing processing for combining recognition results.

When the two obtained indexes are respectively smaller than or equal to the reference values, in other words Expressions 6 and 7 are satisfied, processing for coupling the recognition result 1311 and the recognition result 1312 is performed. Processing for coupling recognition results may be executed by coupling the end points of the line segment 1321 and the line segment 1322 adjacent to each other, for example. FIG. 13C shows a new recognition result 1313 that is obtained after the coupling, indicating that the recognition results are coupled across the image boundary 1301.

Variation of Second Embodiment

In the second embodiment above, a method for combining recognition results that are discontinuous in the vicinity of the boundary between partial images has been described. When combining recognition results across the boundary between partial images, an unnatural recognition result may be created. In view of this, a partial image that includes recognition results, which are candidates for combining, is newly created from the entire image, recognition processing is executed, and a recognition result is acquired again. Accordingly, it is possible to acquire a natural recognition result that is continuous in the vicinity of the image boundary.

Figure 13D:
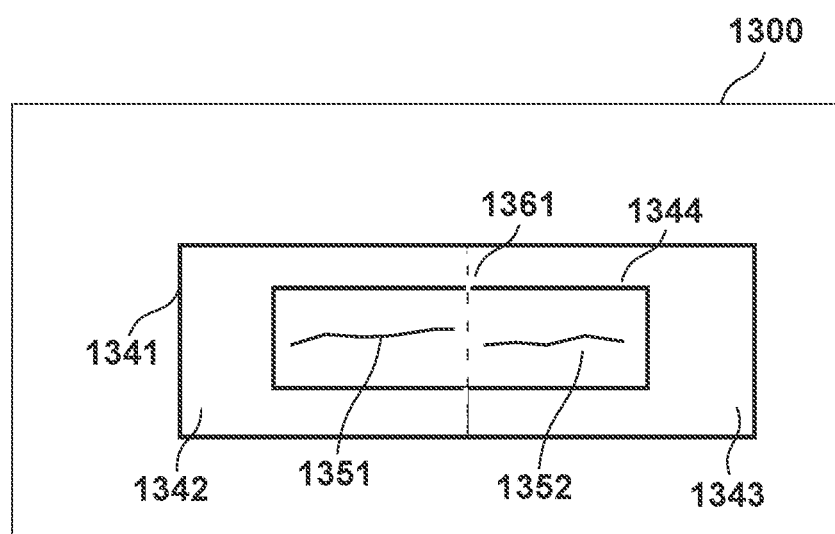
FIG. 13D is a diagram for describing processing for combining recognition results.

Processing for creating a partial image that includes recognition results that are candidates for combining will be described with reference to FIG. 13D. FIG. 13D is a diagram in which an entire image 1341, partial images (1342 and 1343), and recognition results (1351 and 1352) are displayed on a drawing 1300. The recognition result 1351 and the recognition result 1352 are discontinuous in the vicinity of an image boundary 1361. Here, a new partial image 1344 that includes the recognition results 1351 and 1352 is created. This partial image 1344 also includes a region in the vicinity of the image boundary 1361 between the recognition result 1351 and the recognition result 1352. Therefore, a recognition result that is acquired as a result of executing recognition processing on the partial image 1344 is continuous in the vicinity of the image boundary 1361. Therefore, a more natural recognition result than recognition results combined across the image boundary is obtained. The obtained recognition result is then subjected to coordinate conversion, and is stored as a new recognition result associated with the drawing coordinates. Note that, in order to prevent recognition results from being managed redundantly, the original recognition results that are candidates for combining are preferably deleted, for example.

As described above, by using the method described in the present embodiment when recognition results are discontinuous in the vicinity of an image boundary, recognition results can be combined across an image boundary.

Third Embodiment

In the first embodiment, an example has been described in which, in order to acquire a recognition result of a minute crack, partial images are created, recognition processing is executed, and recognition results are acquired, but the resolution of a partial image may be changed according to a recognition target. In order to recognize a minute crack, for example, there is a need to use an high-resolution image. On the other hand, a deformation such as a water leak region or a wide crack that covers a broad range can be visually recognized even in an image with a relatively low resolution, and thus such a deformation can often be recognized even if an image with a lowered resolution is used. By using an image with a lowered resolution, load of recognition processing on the information processing apparatus is decreased, and thus it is possible to increase the speed of recognition processing. Therefore, it is possible to increase the speed of recognition processing by converting the resolution of an image on which recognition processing is to be executed, according to a recognition target. Note that a recognition result that is acquired corresponds to a low-resolution image. Therefore, there is a need to perform processing for associating the acquired recognition result with the original resolution image. The third embodiment will be described below with focus on differences from the first embodiment.

Figure 14:
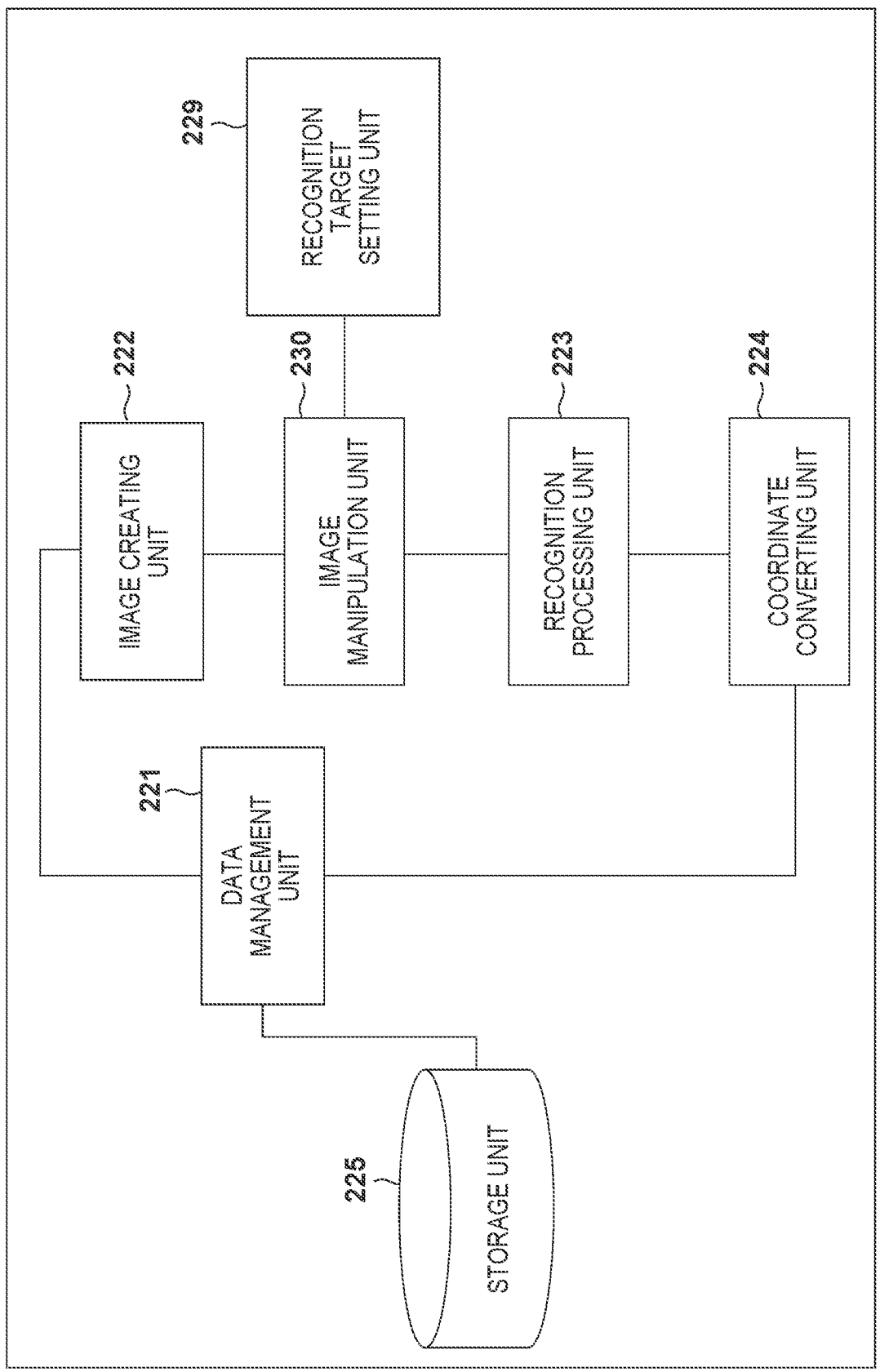
FIG. 14 is a diagram of functional blocks according to a third embodiment.

The hardware configuration of the information processing apparatus 200 according to the third embodiment is based on the configuration of the first embodiment shown in FIG. 2A, and thus a description thereof is omitted. FIG. 14 is a diagram of functional blocks of the information processing apparatus 200 according to the configuration of the third embodiment. The main difference from the configuration of the first embodiment shown in FIG. 2B is that a recognition target setting unit 229 and an image manipulation unit 230 are added. The recognition target setting unit 229 is a function unit of the CPU 201, and executes processing for setting a recognition target. The image manipulation unit 230 is a function unit of the CPU 201, and performs processing for manipulating a second image based on a recognition target set by the recognition target setting unit 229. Processing for manipulating a second image is processing for changing the image resolution, for example. Note that an image manipulation parameter is stored in the RAM 203 or the like. The coordinate converting unit 224 performs processing for converting a recognition result into image coordinates associated with an image that has not been manipulated, using the image manipulation parameter. Accordingly, it is possible to appropriately convert the recognition result into the drawing coordinates.

Figure 15:
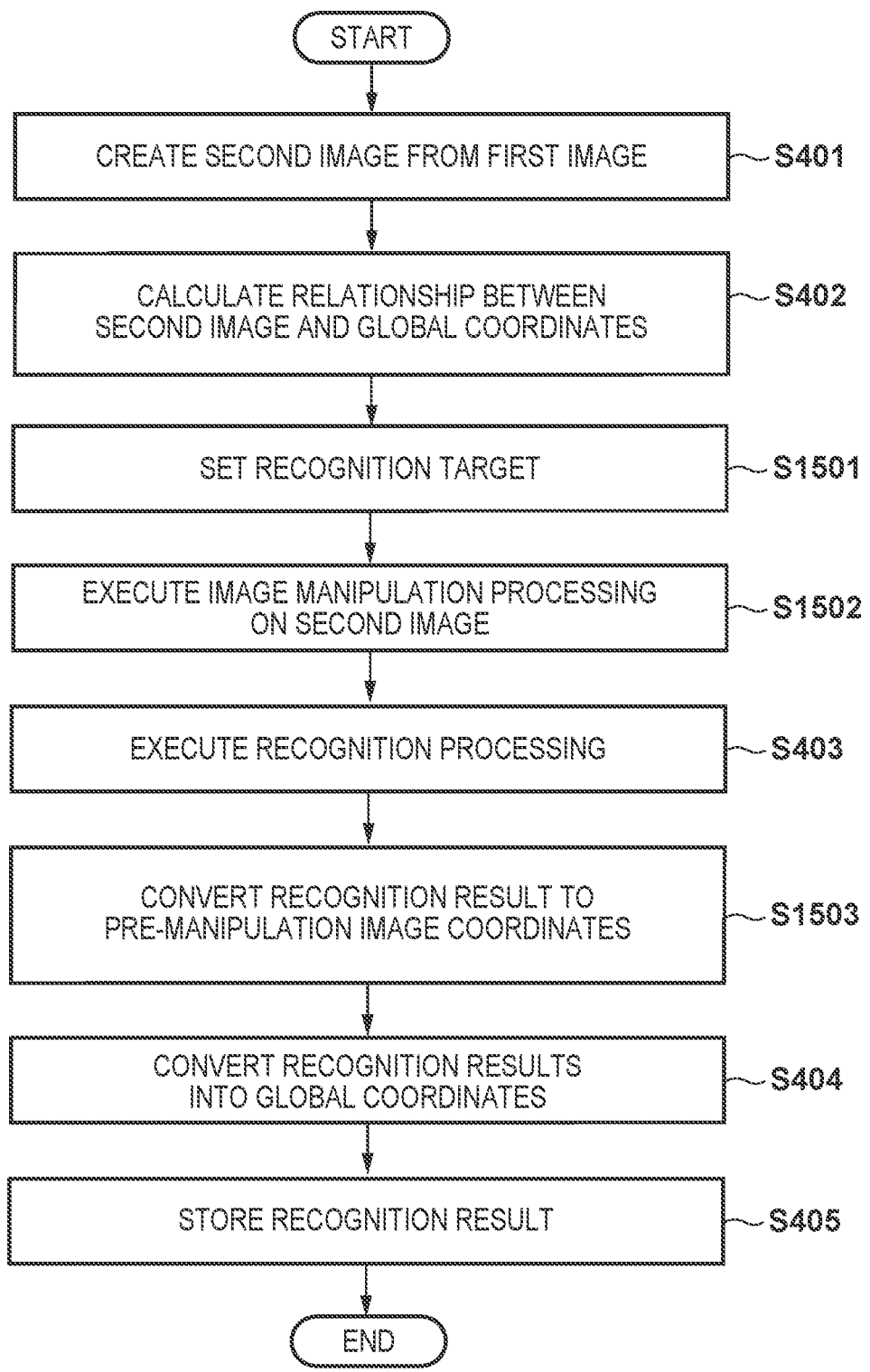
FIG. 15 is a flowchart showing a processing procedure according to the third embodiment.

FIG. 15 is a flowchart showing an example of main processing that is executed by the information processing apparatus 200 according to the third embodiment. In the flowchart in FIG. 15, in steps given the same reference numerals as those of the flowchart in FIG. 4 described in the first embodiment, processing similar to that in the first embodiment is executed.

In the third embodiment, processing for setting a recognition target is performed in step S1501. In the present embodiment, for example, the user sets a recognition target, and the operating unit 206 accepts input from the user. The recognition target setting unit 229 performs processing for setting a recognition target based on the operating unit 206 accepting the input. In a subsequent step S1502, the image manipulation unit 230 determines an image manipulation method based on the recognition target set by the recognition target setting unit 229, and executes image manipulation processing on the second image. In step S1503, in processing that is performed by the coordinate converting unit 224, coordinate converting processing for associating the recognition result acquired in step S403 with the image that has not been manipulated, using an image manipulation parameter is executed. Subsequently, the recognition result is converted into the global coordinates, processing for storing the recognition result in the storage unit 225 is then performed, and the procedure is ended.

Figure 16A:
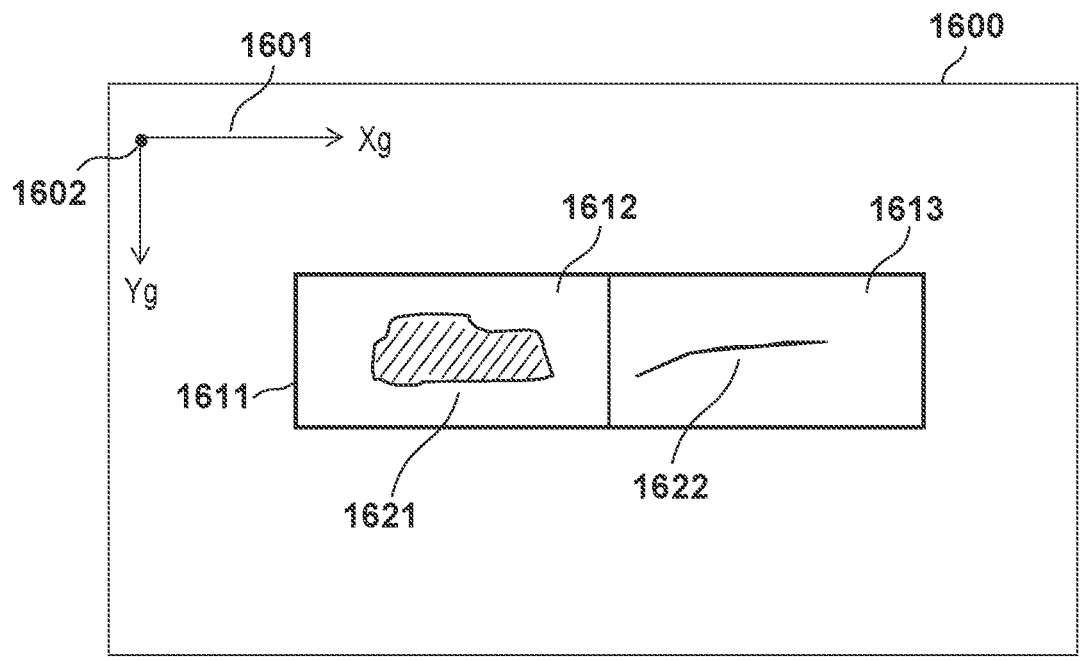
FIG. 16A is a diagram for describing resolution conversion processing that is performed on a second image.
Figure 16B:
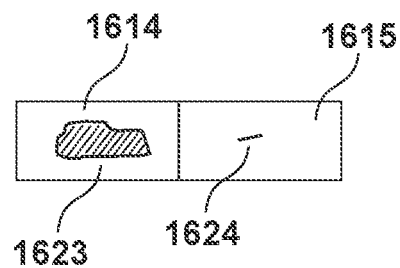
FIG. 16B is a diagram for describing resolution conversion processing that is performed on a second image.

Here, the processing in step S1502 for executing image manipulation processing on a second image based on a recognition target will be schematically described with reference to FIGS. 16A and 16B. FIG. 16A is a diagram in which an entire image 1611 in which a wall surface of a construction is captured, and a partial image 1612 and a partial image 1613 are displayed on a drawing 1600. The partial image 1612 includes a water leak region 1621, and the partial image 1613 includes a minute crack 1622. In processing in step S1502 that is performed by the image manipulation unit 230, manipulation processing is executed on a partial image based on a recognition target. In the third embodiment, processing for executing resolution conversion will be described as an example. In order to execute resolution conversion, it is necessary to associate a recognition target with a resolution transform coefficient in advance. In view of this, for example, a conversion table in which recognition targets and resolution transform coefficients are associated with each other is stored and held in the HDD 204, for example. A resolution transform coefficient is then acquired from the conversion table based on the recognition target set in step S1501, and resolution conversion processing is executed on a partial image. In the present embodiment, it is assumed that a water leak region has been set in step S1501, and a resolution transform coefficient associated with the water leak region in the conversion table is 0.5. FIG. 16B shows partial images 1614 and 1615 with resolutions (horizontal and vertical resolutions) converted into 0.5 time-higher resolutions. Note that any type of resolution conversion method may be adopted, but, for example, in the case of resolution that is 0.5 times higher, it is sufficient that the average value of 2×2 pixels of an original image corresponds to one pixel after resolution conversion.

In general, in order to recognize a minute crack, a high-resolution image needs to be used. If the resolution of an image on which recognition processing is to be executed is decreased as a partial image 1615, a portion (or the entirety) of a crack cannot be visually recognized as a minute crack 1624, for example. Therefore, the performance of the recognition result is likely to decrease. On the other hand, it is easy to visually recognize a water leak region that is a deformation that covers a broad range compared with a minute crack, even in an image with a lowered resolution (a water leak region 1623). Therefore, even if processing for recognizing a water leak region using an image with a lowered resolution is executed, the performance of the recognition result is unlikely to decrease. A load on the information processing apparatus that is used in recognition processing is decreased by lowering the resolution of an image on which recognition processing is executed, and thus it is possible to reduce the processing time required for recognition processing.

Subsequently, in step S403, recognition processing is executed on the image before resolution conversion, and a recognition result is acquired. The recognition result that is acquired is a recognition result associated with the image after image conversion, and thus, before the recognition result is converted into the global coordinates, processing for converting the recognition result into image coordinates before resolution conversion is carried out in step S1503. Coordinate conversion Expressions 8 and 9 for associating the position coordinates (Xlb, Ylb) of any point in the recognition result acquired in step S403 with the image before resolution conversion is as follows, for example.

$$Xla = Xlb/C (C \neq 0) \quad (8)$$

$$Yla = Ylb/C (C \neq 0) \quad (9)$$

The parameter "C" in Expressions 8 and 9 is a resolution transform coefficient. In addition, parameters Xla and Yla indicate a recognition result associated with the image coordinates of image before resolution conversion. By using Expressions 8 and 9, it is possible to acquire the original recognition result before resolution conversion.

In the third embodiment, a method for performing resolution conversion processing, which corresponds to one recognition target, on an image on which recognition processing is to be executed has been described. A configuration may be adopted in which, when a plurality of recognition results are acquired from the same image on which recognition processing is to be executed, a different type of resolution conversion processing is performed for each recognition target, recognition results are acquired using an image with a different resolution for each recognition target, and the acquired recognition results are integrated. In order to recognize two deformations, namely a crack and a water leak region from one partial image on which recognition processing is to be executed, images with different resolutions are created, for example. Here, a resolution transform coefficient corresponding to a crack is indicated by C1, and a resolution transform coefficient corresponding to a water leak region is indicated by C2. Recognition processing is then individually executed on two images with different resolutions, and a recognition result of a crack and a recognition result a of water leak region are acquired. The recognition result of the crack is then converted into the image coordinates before resolution conversion, using the resolution transform coefficient C1 and Expressions 8 and 9. Similarly, the recognition result of the water leak region is also converted using the resolution transform coefficient C2 and Expressions 8 and 9. Subsequently, the two recognition results and one image can be managed on the same drawing by converting the recognition results into the global coordinates.

As described above, it is possible to increase the speed of recognition processing while suppressing the influence of a recognition result, by converting the image resolution according to a recognition target. Note that, in the third embodiment, processing for applying resolution conversion (enlarge/reduce conversion) has been described as image manipulation processing for executing recognition processing according to a recognition target, but other manipulation processing may also be used. It is needless to say that, for example, rotation transform is also applicable to an image (changing the orientation of the image) in which recognition processing is to be executed, according to a recognition target.

Fourth Embodiment

In the first embodiment, an example has been described in which a recognition result in a partial image created from an image associated with a two-dimensional drawing is managed in association with the drawing, but an image associated with a three-dimensional drawing may also be used. Three-dimensional drawing data is, for example, data in which images in which a construction is captured from various directions are pasted on a 3D model created using 3DCAD software or the like. In such a case, for example, a partial image of a three-dimensional drawing taken from any viewpoint is created, and recognition processing is executed. This enables efficient inspection in which a partial image that includes a portion that is likely to deteriorate in the structure is created, and recognition processing is performed. An image and a recognition result can be easily managed on a three-dimensional drawing by storing a acquired recognition result in association with the three-dimensional drawing. The fourth embodiment will be described below with focus on differences from the first embodiment. Note that, in the fourth embodiment, assume that a first image is an image of a wall surface pasted onto a 3D model, and a second image is a partial image extracted from a three-dimensional drawing. Also, assume that global coordinates are three-dimensional drawing coordinates associated with the three-dimensional drawing and local coordinates are regional coordinates associated with the partial image.

Figure 17:
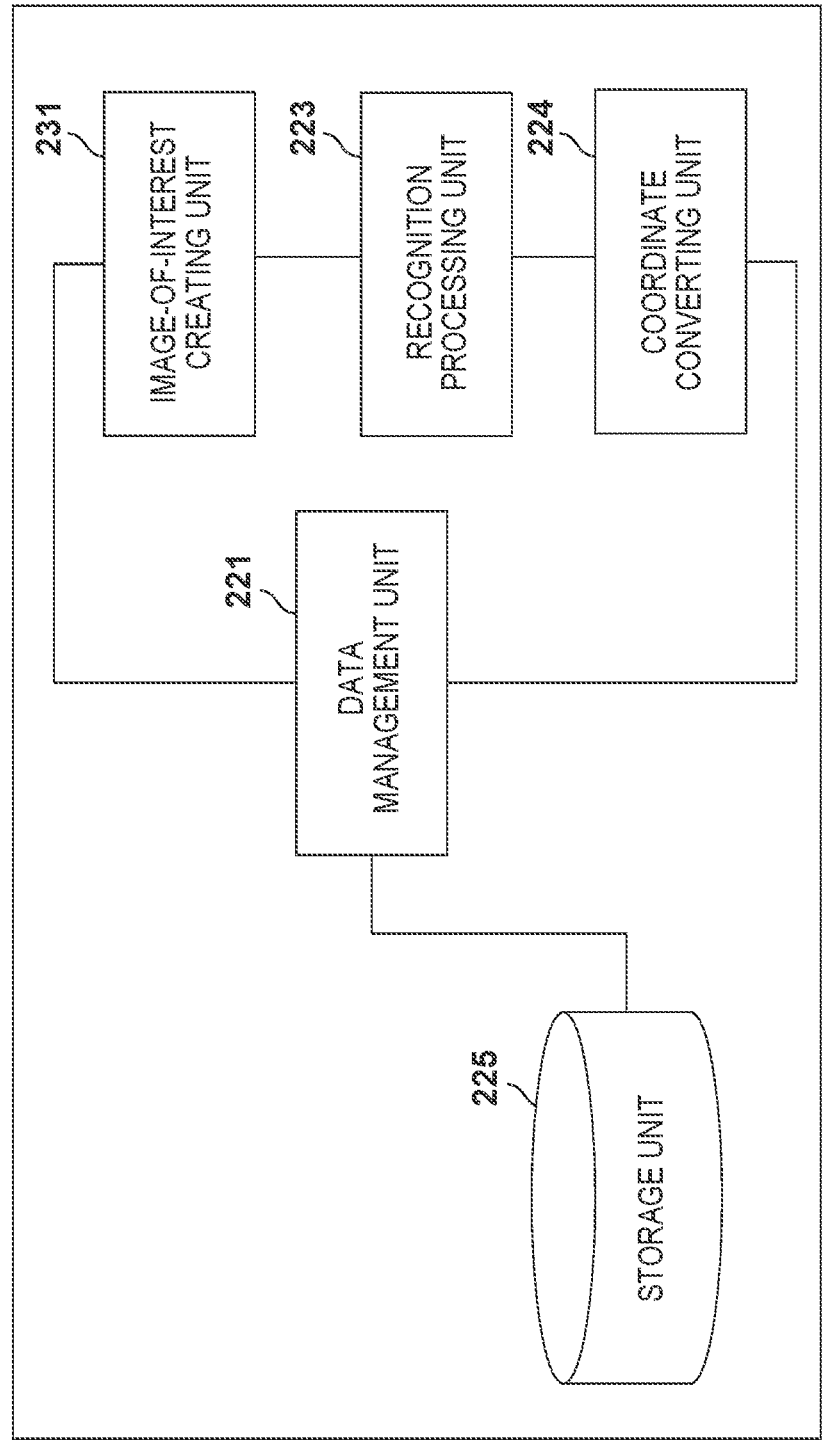
FIG. 17 is a diagram of functional blocks according to a fourth embodiment.

The hardware configuration of the information processing apparatus 200 according to the fourth embodiment is based on the configuration of the first embodiment shown in FIG. 2A, and thus a description thereof is omitted. FIG. 17 is a diagram of functional blocks of the information processing apparatus 200 according to the configuration of the fourth embodiment. The difference from the first embodiment is that the image creating unit 222 according to the first embodiment in FIG. 2B is replaced with an image-of-interest creating unit 231. The image-of-interest creating unit 231 is a function unit of the CPU 201, and processing for creating a partial image in a range of interest as a second image from a first image on a three-dimensional drawing is executed. Examples of a method for creating a second image from a first image on a three-dimensional drawing includes a method for pasting a first image onto a 3D model in a three-dimensional drawing, and extracting a display range from any viewpoint as a second image. Additionally, processing for calculating the relationship between the created second image and three-dimensional drawing coordinates is performed. Note that 3D model data of a construction, images in which the construction is captured from various directions, and recognition results are stored in the storage unit 225.

Figure 18:
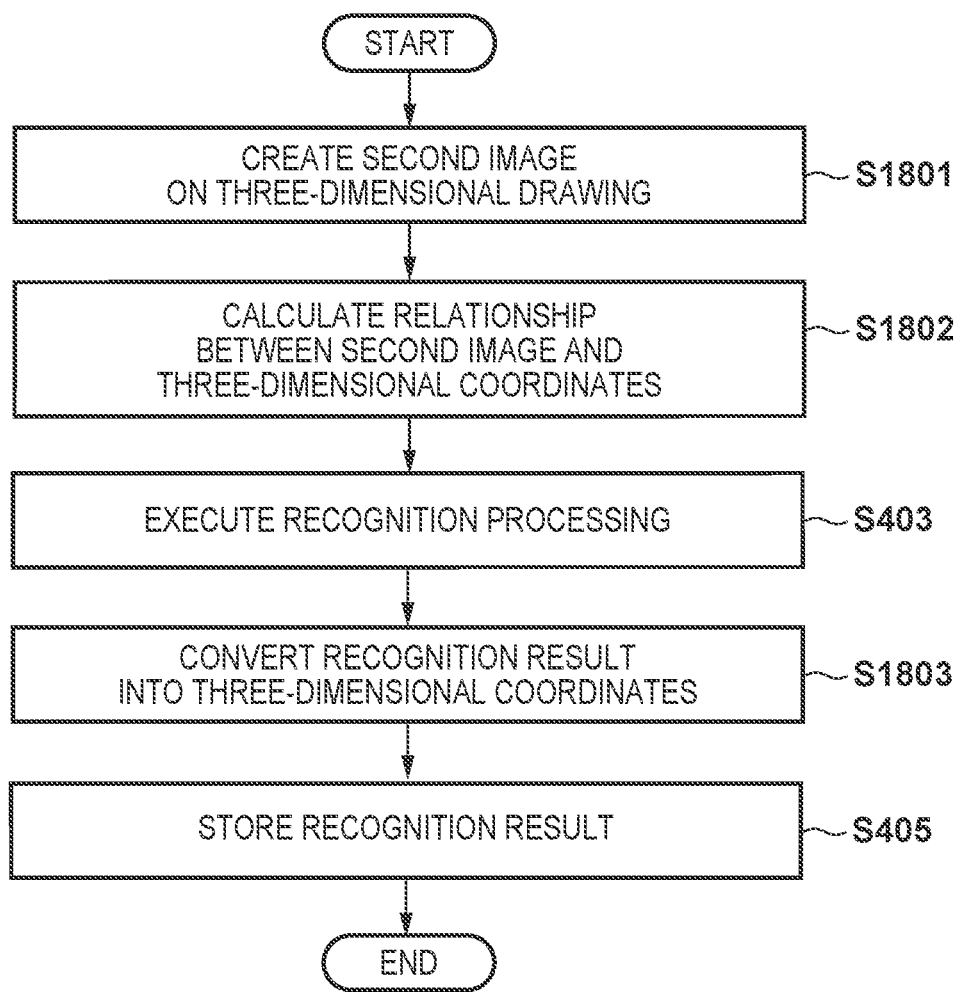
FIG. 18 is a flowchart showing a processing procedure according to the fourth embodiment.

FIG. 18 is a flowchart showing an example of main processing that is executed by the information processing apparatus 200 according to the fourth embodiment. In the flowchart in FIG. 18, in steps given the same reference numerals as those of the flowchart in FIG. 4 described in the first embodiment, processing similar to that in the first embodiment is executed. In the fourth embodiment, in step S1801, the image-of-interest creating unit 231 creates a second image, from a first image on a three-dimensional drawing. In the present embodiment, for example, processing for creating, as a second image, a partial image of a 3D model when viewed from any viewpoint is performed, and a first image of a construction captured therein is pasted on the 3D model. Examples of a method for setting a viewpoint or the like on a three-dimensional drawing includes a method in which the user specifies a viewpoint or the like. The display unit 205 is caused to display the 3D model on which a construction image is pasted, and the user sets a viewpoint position, a display range, and the like while viewing the display unit 205, and the operating unit 206 accepts input from the user. The image-of-interest creating unit 231 sets a viewpoint position, a display range, and the like, based on the operating unit 206 accepting the input, and performs processing for creating a second image. In a subsequent step S1802, the image-of-interest creating unit 231 calculates the relationship between the second image and the global coordinates. The second image is a partial image of the three-dimensional drawing, and has local coordinates. A method for calculating the relationship between the local coordinates and the global coordinates is executed using a known technique. Therefore, the relationship can be calculated, for example, using the method such as that disclosed in Patent Document 3 although a detailed description thereof is omitted. In step S1803, the coordinate converting unit 224 executes processing for converting a recognition result in the second image acquired in step S403, into the three-dimensional drawing coordinates. Processing for converting a recognition result into three-dimensional drawing coordinates can also be realized by performing inversed processing in step S1802 using a known technique. Subsequently, in step S405, the data management unit 221 performs processing for storing the recognition result converted into three-dimensional drawing coordinates, in the storage unit 225, and ends the procedure.

Figure 19A:
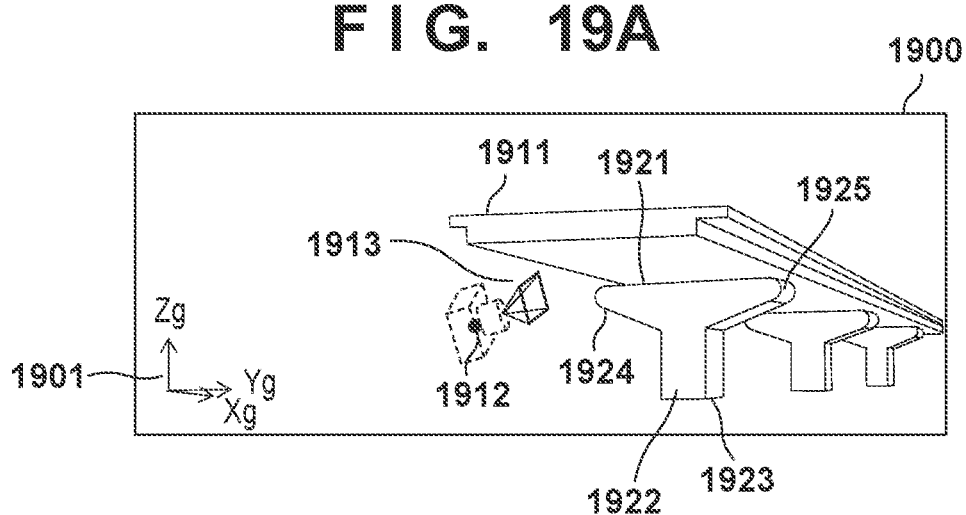
FIG. 19A is a diagram describing processing for creating a second image from a three-dimensional drawing.
Figure 19B:
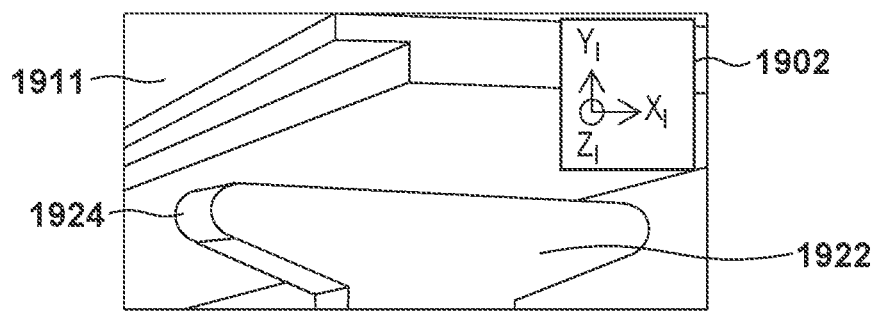
FIG. 19B is a diagram describing processing for creating a second image from a three-dimensional drawing.

Processing for creating a second image from a viewpoint on a three-dimensional drawing set by the user will be schematically described with reference to FIGS. 19A and 19B. FIG. 19A is a diagram showing three-dimensional drawing coordinates 1901 and a 3D model 1911 of a bridge on a three-dimensional drawing 1900. The 3D model 1911 may be a 3D model created using CAD software or the like, or a 3D model created through three dimensional re-configuration based on images in which a construction is captured. Assume that images in which a bridge is captured from various directions are pasted on the surface of the 3D model 1911. In step S1801, the image-of-interest creating unit 231 extracts an image corresponding to the viewpoint and located within the display range in accordance with the settings made the user, from the construction image of the surface of the 3D model 1911, and creates a second image. FIG. 19B shows a partial image created from a viewpoint 1912 within a display range 1913 in FIG. 19A. The image in FIG. 19B is an image that covers a plurality of surfaces of the 3D model 1911, and has local coordinates 1902. By creating a partial image from a viewpoint desired by the user, efficient inspection is enabled in which a partial image of a portion that is likely to deteriorate in a structure is created, and recognition processing is performed, for example.

Variation of Fourth Embodiment

Figure 19C:
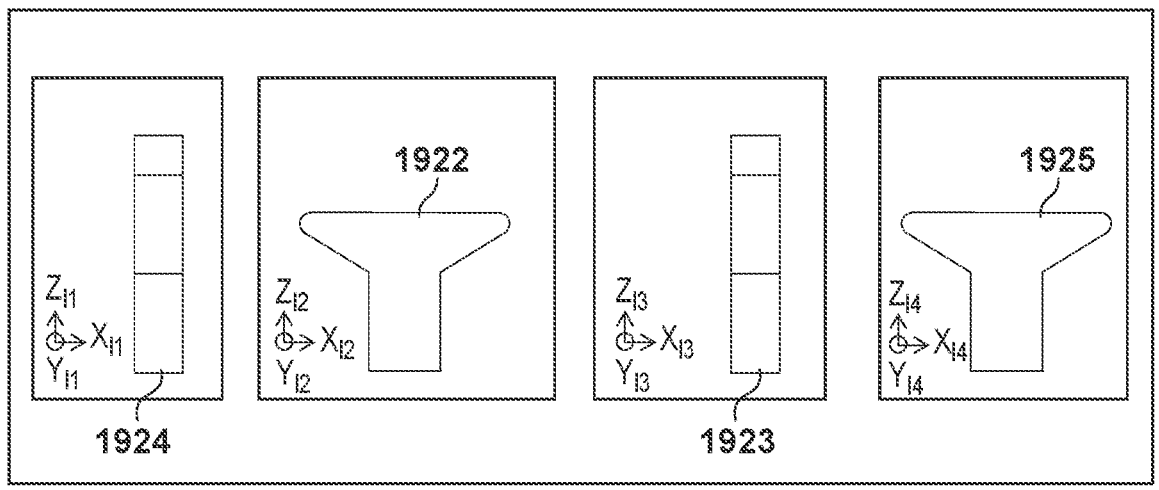
FIG. 19C is a diagram describing processing for creating a second image from a three-dimensional drawing.

In the fourth embodiment above, a method for creating a partial image from a viewpoint set by the user on a three-dimensional drawing, from an image associated with the three-dimensional drawing has been described. As a method for creating a partial image from an image associated with a three-dimensional drawing, an exploded view of a 3D model may be used. In the partial image created from any viewpoint on the three-dimensional drawing, a hidden portion is not displayed in the partial image, for example. Therefore, when a construction has a complicated shape, a plurality of partial images are created, making the operation complicated. In such a case, a partial image can be efficiently created by using an exploded view of the 3D model. FIG. 19C shows an example of a partial image of a pier 1921 on the 3D model 1911, created using an exploded view. The image in FIG. 19C is a partial image that includes wall surface images (1922, 1923, 1924, and 1925) taken from four directions of the pier 1921, and, even a wall surface that is hidden from one viewpoint can be easily created as a partial image. In this manner, by using an exploded view of the 3D model, it is possible to easily create a partial image taken from viewpoints in a plurality of direction.

As described above, even when an image associated with a three-dimensional drawing is used, a recognition result can be easily managed by creating a partial image suitable for recognition and associating the recognition result with the three-dimensional drawing.

According to the present invention, recognition is performed in partial images, and recognition results of the partial images can be managed in association with an entire image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   an image creating unit which creates, from a first image associated with global coordinates and including a construction, a partial image that is a portion of the first image, as a second image, wherein the global coordinates are drawing coordinates associated with a drawing of the construction that is an examination target;
   a recognition processing unit which executes, on the second image, recognition processing of a deformation formed on a surface of the construction, and which acquires information that includes a position of the deformation formed on the surface of the construction in association with local coordinates of the second image, wherein the local coordinates are coordinates associated with the partial image; and
   a coordinate converting unit which converts the coordinates of the position of the deformation from the local coordinates into the global coordinates,
   wherein the image creating unit creates a second partial image from the first image based on a plurality of recognition results.

2. The information processing apparatus according to claim 1, wherein the image creating unit (a) includes a unit which determines a size of the second image based on a resource of an information processing apparatus that executes the recognition processing, and (b) creates from the first image, as the second image, a partial image that is within the size.

3. The information processing apparatus according to claim 1, wherein the image creating unit (a) includes a unit which determines a range of the second image based on a characteristic of an image calculated based on the first image, and (b) creates from the first image, as the second image, a partial image of the range.

4. The information processing apparatus according to claim 1, wherein the image creating unit (a) includes a unit which determines a size and a range of the second image based on (i) a resource of an information processing apparatus that executes the recognition processing and (ii) a characteristic of an image calculated based on the first image, and (b) creates from the first image, as the second image, a partial image of the range within the size.

5. The information processing apparatus according to claim 1, wherein the first image is an image, obtained by capturing the construction, associated with the global coordinates, and
   wherein the local coordinates are regional coordinates associated with the partial image created from the first image.

6. The information processing apparatus according to claim 1, wherein the deformation includes a crack formed on the surface of the construction.

7. An information processing method that is executed by an information processing apparatus, the method comprising:
   creating, from a first image associated with global coordinates and including a construction, a partial image that is a portion of the first image as a second image wherein the global coordinates are drawing coordinates associated with a drawing of the construction that is an examination target;
   executing recognition processing of a deformation formed on a surface of the construction, in the second image, and acquiring information that includes a position of the deformation formed on the surface of the construction in association with local coordinates of the second image, wherein the local coordinates are coordinates associated with the partial image; and
   converting the coordinates of the position of the deformation from the local coordinates into the global coordinates,
   wherein the creating creates a second partial image from the first image based on a plurality of recognition results.

8. A non-transitory computer-readable storage medium storing a program which, when read and executed by a computer, causes the computer to executes the steps of an information processing method, the method comprising:
   creating, from a first image associated with global coordinates and including a construction, a partial image that is a portion of the first image as a second image, wherein the global coordinates are drawing coordinates associated with a drawing of the construction that is an examination target;
   executing recognition processing of a deformation formed on a surface of the construction, in the second image, and acquiring information that includes a position of the deformation formed on the surface of the construction in association with local coordinates of the second image, wherein the local coordinates are coordinates associated with the partial image; and converting the coordinates of the position of the deformation from the local coordinates into the global coordinates, wherein the creating creates a second partial image from the first image based on a plurality of recognition results.

\* \* \* \* \*